US009100876B2

(12) United States Patent
Koyanagi et al.

(10) Patent No.: US 9,100,876 B2
(45) Date of Patent: *Aug. 4, 2015

(54) SYNCHRONIZATION SYSTEM AND SYNCHRONIZING METHOD FOR PLURALITY OF BASE STATIONS AND MOBILE STATION IN A REVERSE LINK WIRELESS TRANSMISSION

(71) Applicants: Kenji Koyanagi, Tokyo (JP); Yoshikazu Kakura, Tokyo (JP); Jinsock Lee, Tokyo (JP); Nahoko Kuroda, Tokyo (JP)

(72) Inventors: Kenji Koyanagi, Tokyo (JP); Yoshikazu Kakura, Tokyo (JP); Jinsock Lee, Tokyo (JP); Nahoko Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,271

(22) Filed: Jun. 10, 2014

(65) Prior Publication Data

US 2014/0307709 A1    Oct. 16, 2014

Related U.S. Application Data

(63) Continuation of application No. 13/544,813, filed on Jul. 9, 2012, now Pat. No. 8,797,964, which is a continuation of application No. 11/997,869, filed as application No. PCT/JP2006/316369 on Aug. 22, 2006, now Pat. No. 8,243,653.

(30) Foreign Application Priority Data

Aug. 23, 2005   (JP) ................................ 2005-241913

(51) Int. Cl.
*H04W 36/00*    (2009.01)
*H04W 36/30*    (2009.01)
*H04W 56/00*    (2009.01)

(52) U.S. Cl.
CPC .......... *H04W 36/0005* (2013.01); *H04W 36/30* (2013.01); *H04W 56/001* (2013.01); *H04W 56/0045* (2013.01)

(58) Field of Classification Search
None
See application file for complete search history.

(56) References Cited

U.S. PATENT DOCUMENTS 6,438,377 B1    8/2002    Savolainen
6,850,501 B1    2/2005    Sebire
(Continued)

FOREIGN PATENT DOCUMENTS

EP    1507422 A1    2/2005
JP    06-209492 A    7/1994
(Continued)

OTHER PUBLICATIONS

Japanese Office Action dated May 12, 2011 for Patent Application No. 2007-532106.
(Continued)

*Primary Examiner* — John Blanton
(74) *Attorney, Agent, or Firm* — Sughrue Mion, PLLC

(57) ABSTRACT

There is provided a wireless communication system which can synchronize a mobile station with a destination base station in response to the mobile station determining to switch base stations. Each base station generates synchronization information to synchronize the mobile station with the base station from a reverse pilot signal received from the mobile station, generates reverse propagation quality information from the reverse pilot signal, and generates and transmits a control signal including the synchronization information and the reverse propagation quality information. A mobile station generates and transmits a reverse pilot signal, receives a signal including the control signal from each of the base stations.

4 Claims, 20 Drawing Sheets

(56) References Cited

U.S. PATENT DOCUMENTS

| | | |
|---|---|---|
| 2004/0176147 A1 | 9/2004 | Escalante |
| 2004/0258020 A1 | 12/2004 | Hayata |
| 2005/0159158 A1 | 7/2005 | Pardeep et al. |
| 2005/0272426 A1* | 12/2005 | Yang et al. .................. 455/436 |
| 2008/0049674 A1 | 2/2008 | Cha et al. |
| 2008/0051086 A2 | 2/2008 | Etemad et al. |
| 2009/0207811 A1* | 8/2009 | Zhu et al. ...................... 370/332 |

FOREIGN PATENT DOCUMENTS

| | | |
|---|---|---|
| JP | 09-163432 A | 6/1997 |
| JP | 2002-300628 A | 10/2002 |
| JP | 2003-143639 A | 5/2003 |
| JP | 2003-169368 A | 6/2003 |
| JP | 2003-500909 A | 7/2003 |
| JP | 2004-511150 A | 4/2004 |
| JP | 2005-117310 A | 4/2005 |
| JP | 2006-510279 A | 3/2006 |
| WO | 02/30142 A2 | 4/2002 |
| WO | 02089502 A2 | 11/2002 |
| WO | 2004/056144 A1 | 7/2004 |
| WO | 2005/018256 A1 | 2/2005 |

OTHER PUBLICATIONS

Non-Final Janapese Office Action issued Sep. 12, 2011 in corresponding Japanese Patent Application No. 2007-532106.
Goto, Y. et al., "Variable Spreading and Chip Repetition Factors (VSCRF)-CDMA in Reverse Link for Broadbad Packet Wireless Access", Feb. 2005, pp. 1-11, vol. E88-B, IEICE Commun.
Office Action, dated Mar. 5, 2013, issued by the Japanese Patent Office in counterpart Japanese Application No. 2012-061936.
Extended Search Report dated Aug. 2, 2013 issued by the European Patent Office in counterpart European Application No. 06782873.1.
Office Action dated Aug. 14, 2013 issued by the Japanese Patent Office in counterpart Japanese Patent Application No. 2012-061936.
"A candidate for three-way handover on USTS"; SK Telecom; 3GPP TSG RAN WG 2 #21; R2-011190; May 25, 2001; 6 pgs.
"A candidate for three-way handover on USTS"; SK Telecom; 3GPP TSG RAN WG 2 #21; R2-011305; May 25, 2001; 6 pgs.
"A candidate for three-way handover on USTS"; SK Telecom; TSG RAN WG3 meeting#21; TSGR3#21(01)1743; May 25, 2001; 6 pgs.

* cited by examiner

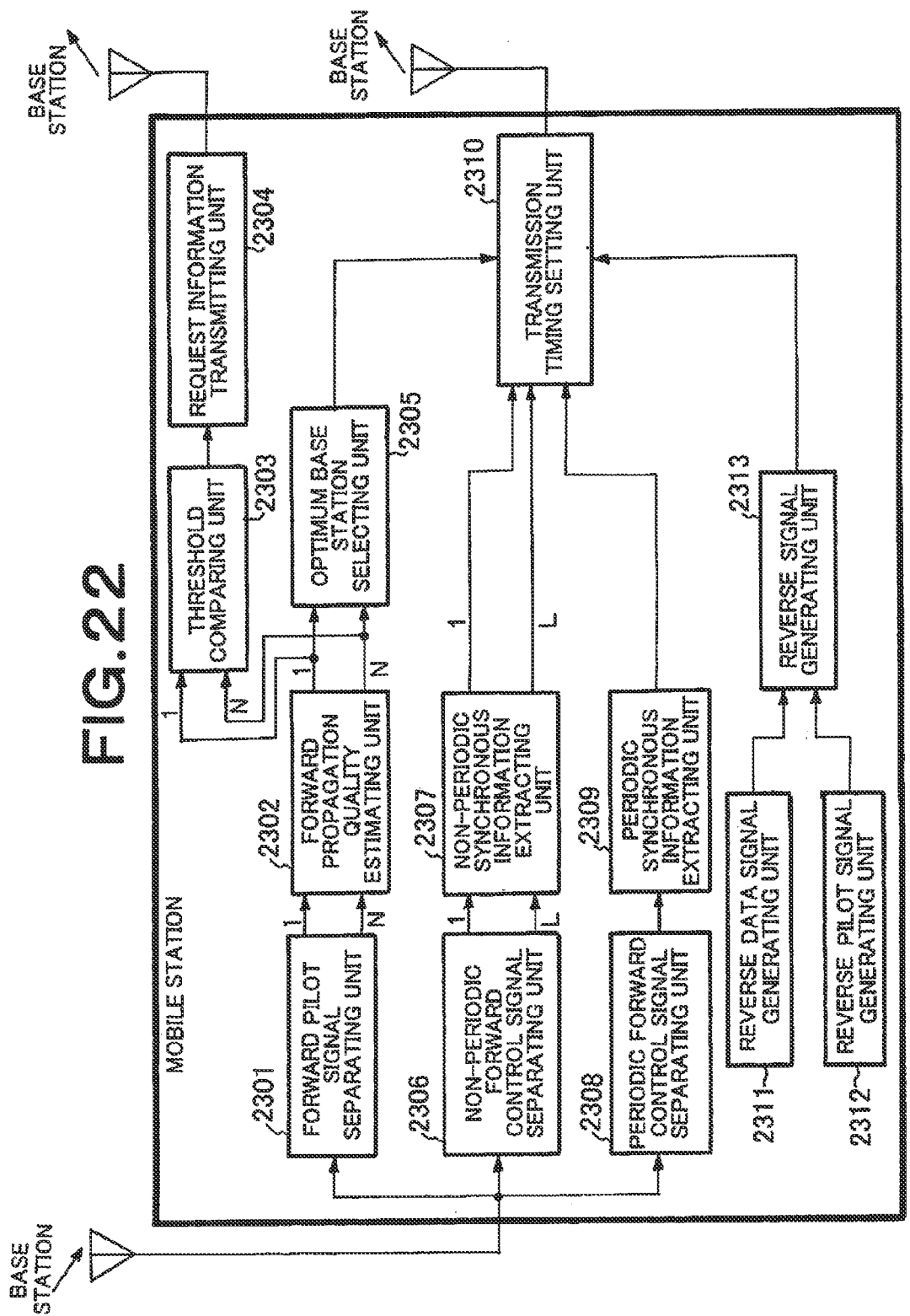

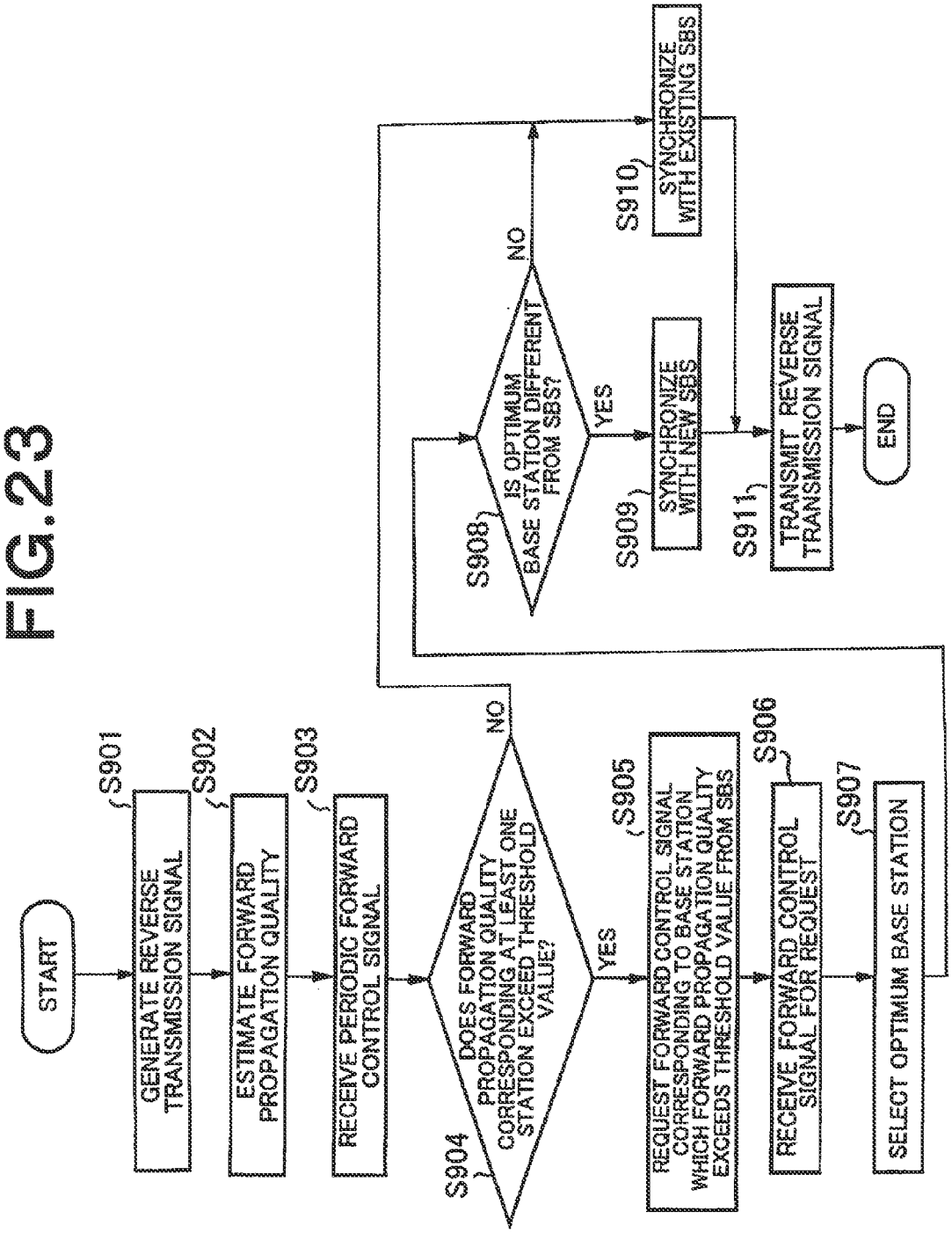

SYNCHRONIZATION SYSTEM AND SYNCHRONIZING METHOD FOR PLURALITY OF BASE STATIONS AND MOBILE STATION IN A REVERSE LINK WIRELESS TRANSMISSION

CROSS-REFERENCE TO RELATED APPLICATION

This application is a Continuation of U.S. application Ser. No. 13/544,813 filed Jul. 9, 2012, which is a Continuation of U.S. application Ser. No. 11/997,869 filed Feb. 4, 2008 which is a 371 of PCT/JP2006/316369 filed Aug. 22, 2006, which claims benefit of Japanese Application No. 2005-241913 filed Aug. 23, 2005, the disclosures of which are incorporated herein by reference in their entirety.

TECHNICAL FIELD

The present invention relates to synchronization between a plurality of base stations and a mobile station in a wireless communication system using a wireless transmission method which requires synchronization between users in base station cells.

BACKGROUND ART

In a conventional wireless communication system constituted by a plurality of base stations, a technique referred to as handover is used (For example, see Patent Document 1). In a conventional handover method, a mobile station measures received powers of signals received from the plurality of base stations. On the basis of the measurement results, a first base station providing a maximum received-power to the mobile station and a second base station providing the second highest received-power to the mobile station are selected. A condition is used as a trigger which causes the mobile station to switch the base station. The condition is that a received-power difference between the first and second base stations is smaller than a preset threshold value and time at which the difference is smaller than the threshold value is equal to or longer than set time set in advance. As a result, the mobile station can maintain high communication quality by switching between the base stations with reference to the received-power difference. Furthermore, only when the time at which the received-power difference is smaller than the threshold value is equal to or longer than the set time, the mobile station switches between the base stations. Therefore, a system load caused by switching between the base stations can be reduced.

A conventional handover process will be described below with reference to the flow chart shown in FIG. 1. First, forward (downward) pilot signals are received from first to Nth base stations from which a mobile station receives signals, forward propagation quality is measured (step S101). Next, a power difference between the first base station having the maximum received-power and the base station having the second highest received-power is calculated (step S102).

When the received-power difference between the first and second base stations is smaller than the threshold value set in advance (step S103), and it is determined that time at which the difference is smaller than the threshold value is equal to or longer than the set time set in advance (step S104), switching between the base stations is carried out (step S105).

On the other hand, a wireless transmission method which requires synchronization between users of base stations includes a method which performs synchronization by using Cyclic Prefixes to control a timing error between the users within a Cyclic Prefix so as to prevent interference between the users (For example, see Non-patent Document 1).

Patent Document 1: Japanese Patent Application National Publication (Laid-Open) No. 2003-500909

Non-patent Document 1: Variable Spreading and Chip Repetition Factors (VSCRF)-CDMA in Reverse Link for Broadband Packet Wireless Access, Y Goto, T Kawamura, H Atarashi, M Sawahashi, IEICE Commun., VOL. E88-B, NO. 2 Feb. 2005

DISCLOSURE OF THE INVENTION

Problems to be Solved by the Invention

However, when a conventional handover method is applied to a wireless communication system using a wireless transmission method which requires synchronization between users in base station cells, delay occurs to obtain new synchronization in a non-serving base station serving as a handover destination. Furthermore, since a mobile station is synchronized with only a serving base station serving as a handover source, an error may be generated in measurement of forward link receiving quality from the non-serving base station or reverse link receiving quality in the non-serving base station.

Therefore, it is an object of the present invention to provide a wireless communication system and method using a wireless transmission method which requires synchronization between users in base station cells, wherein a mobile station can be synchronized with a switched base station the moment it is determined to switch base stations.

Means for Solving the Problem

In order to solve the above problem, the present invention provides a wireless communication system constituted by a plurality of base stations and a mobile station, wherein each of the base stations includes: means for generating synchronization information to synchronize the mobile station with the base station from a reverse pilot signal received from the mobile station; means for generating reverse propagation quality information from the reverse pilot signal; and means for generating a forward control signal including the synchronization information and reverse propagation quality information and transmitting, and the mobile station includes: means for generating and transmitting the reverse pilot signal; means for receiving a signal including the forward control signal from each of the base stations; means for extracting a reverse propagation quality and the synchronization information with the base station, from the received forward control signal; means for selecting an optimum base station as a new serving base station from the received reverse propagation quality; and means for changing a transmission timing of the reverse pilot signal to a transmission timing based on the synchronization information extracted from the forward control signal of the selected base station and transmitting when the selected base station is different from the serving base station.

With the above configuration, the serving base station and the non-serving base station estimate reception timings of a reverse link on the base of the reverse pilot signal and calculate information used to cause the mobile station to be synchronized with the base stations to notify the mobile station of the information. The moment the mobile station determines to switches the base station, the mobile station can be synchronized with the destination base station on the basis of the notification information.

Effect of the Invention

According to the present invention, the serving base station and the non-serving base station estimate reception timings of a reverse link on the base of the reverse pilot signal and calculate information used to cause the mobile station to be synchronized with the base stations to notify the mobile station of the information. The moment the mobile station determines to switches the base station, the mobile station can be synchronized with the destination base station on the basis of the notification information. Furthermore, the mobile station can transmits a reverse link pilot signal used when the mobile station is synchronized with the serving base station by using the notification information. As a result, even in the non-serving base station, reverse link receiving quality can be estimated.

BRIEF DESCRIPTION OF THE DRAWINGS

FIG. 22 is a functional block diagram of a mobile station according to the fourth embodiment; and FIG. 23 is a flow chart showing processes of the mobile station according to the fourth embodiment.

REFERENCE NUMERALS

1001 Reverse pilot signal separating unit
1002 Trigger generating unit
1003 Reverse propagation quality information generating unit
1004 synchronous information generating unit
1005 forward control signal generating unit
1006 forward control signal transmitting unit
2001 forward control signal separating unit
2002 reverse propagation quality information extracting unit
2003 base station selecting unit
2004 synchronous information extracting unit
2005 transmission timing selecting unit
2006 transmission timing setting unit
2007 reverse data signal generating unit
2008 reverse pilot signal generating unit
2009 reverse transmission signal generating unit

BEST MODE FOR CARRYING OUT THE INVENTION

A best mode of the present invention will be described below with reference to drawings.

1. A mobile station (MS: Mobile Station) transmits a reverse pilot signal to a serving base station (SBS: Serving Base Station) serving as a handover source and a non-serving base station (NSBS: Non-Serving BS) except for the serving base station. The SBS and the NSBS estimate reverse reception timings. The SBS and the NSBS generate transmission timings to the mobile station which the mobile station is synchronized with the SBS and the NSBS, as synchronization information. The SBS and the NSBS transmit forward (downward) control signals including at least the synchronization information to the mobile station. The mobile station changes transmission timings of data and a reverse pilot signal to a destination SBS to be synchronized with the destination SBS when SCs (Serving Cells) are switched. When the SCs are not switched, the mobile station changes the transmission timings of the data and the reverse pilot signal to be synchronized with the SBS.

More specifically, the serving base station and the non-serving base station estimate a reception timing of a reverse link on the basis of the reverse pilot signal, calculate information used to cause the mobile station to be synchronized with the base stations to notify the mobile station of the information. On the basis of the notification information, an effect in that the mobile station can be synchronized with the destination base station the moment the mobile station determines to switch between the base stations can be obtained.

Figure 1:
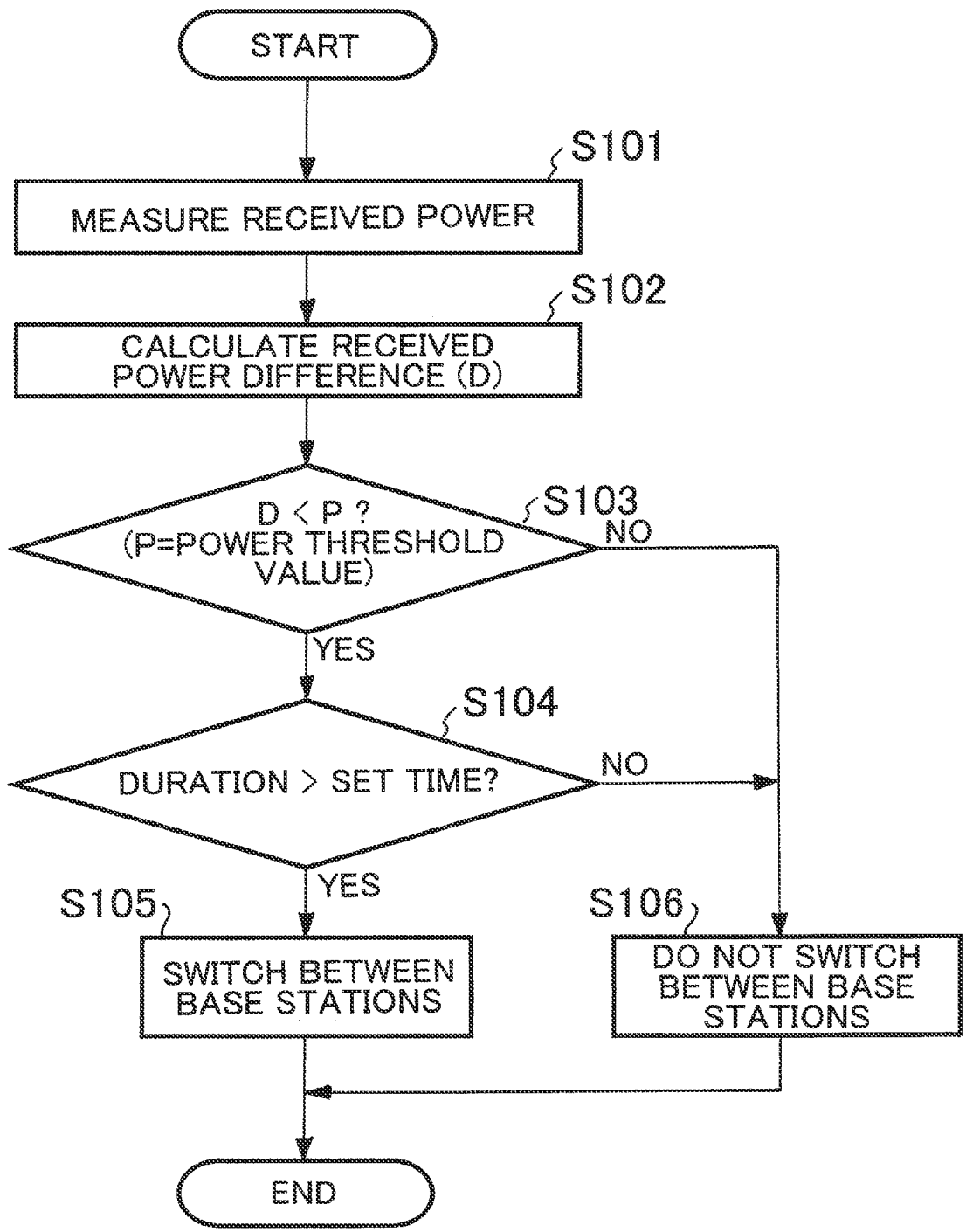
FIG. 1 is a flow chart showing a process of a conventional mobile station.
Figure 2:
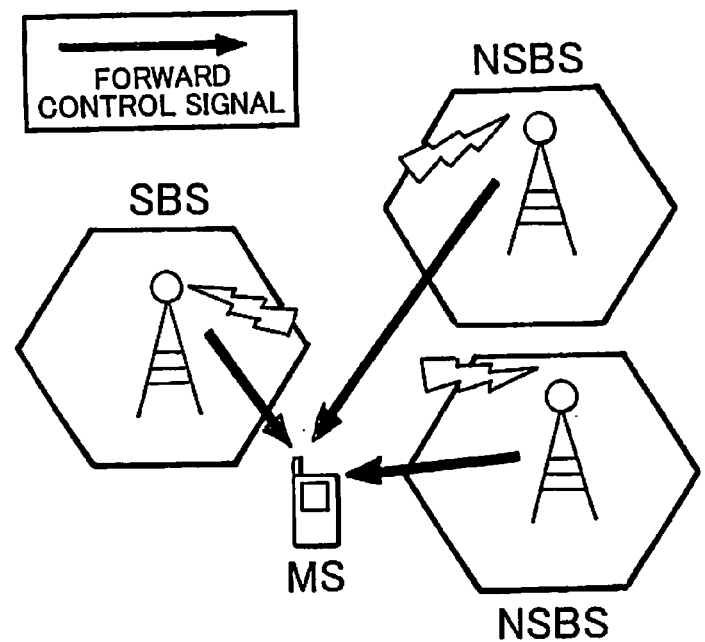
FIG. 2 is an explanatory diagram for a case in which all base stations transmit forward control signals to a mobile station.

2. All the base stations transmit forward control signals to the mobile station. FIG. 2 is an explanatory diagram of the operation (the mobile station selects the base station).

The effect obtained by the operation is the easiest method as a transmission method of forward control information since the base station independently transmits a forward control signal. Furthermore, a base station control device such as an RNC (Radio Network Controller) is not necessary.

Figure 3:
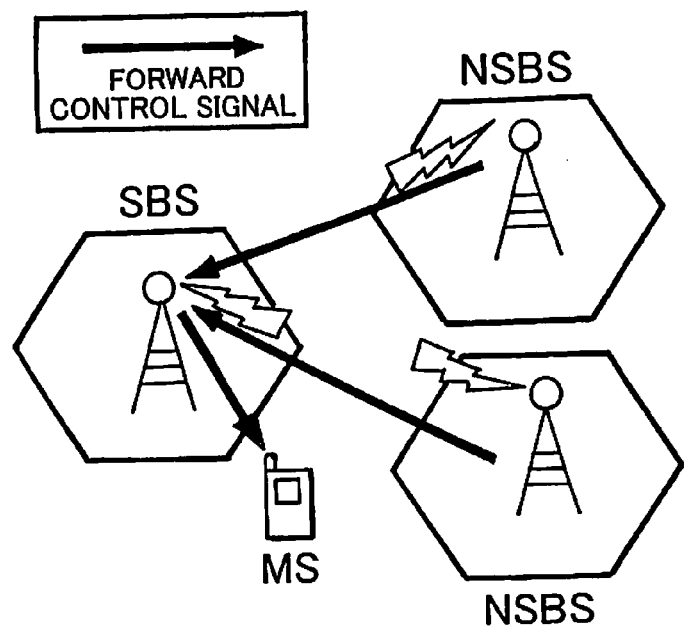
FIG. 3 is an explanatory diagram for a case in which all NSBSs directly transmit forward control signals to an SBS.

3. All the NSBSs directly transmit forward control signals to the SBS. FIG. 3 is an explanatory diagram of the operation. The SBS transmits the forward control signals of all the base stations to the mobile station at once (the mobile station selects the base station).

An effect obtained by the operation is that the mobile station is required only to receive the forward control signal from the SBS because the forward control signals are collected and transmitted to the mobile station at once by the SBS. Furthermore, a base station control device such as an RNC is not necessary.

Figure 4:
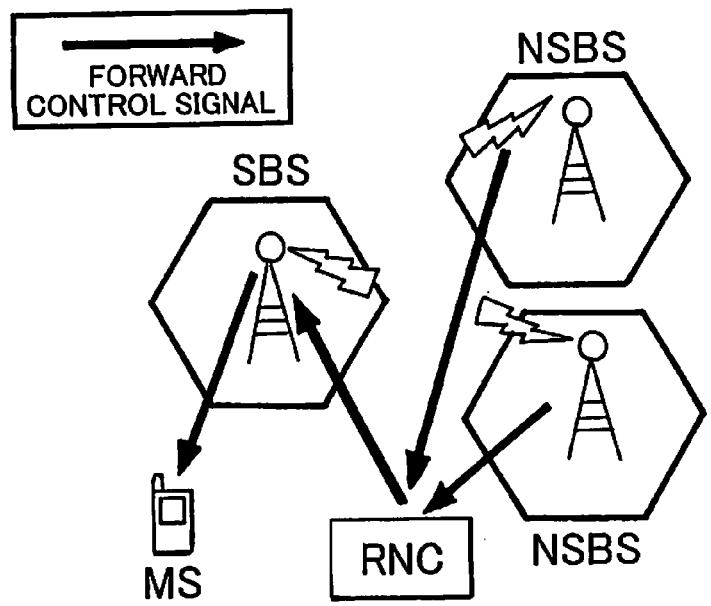
FIG. 4 is an explanatory diagram for a case in which all NSBSs transmit forward control signals to an RNC.

4. All the NSBSs transmit forward control signals to the RNC, and the RNC transmits the forward control signals of all the NSBSs to the SBS. FIG. 4 is an explanatory diagram of the operation. The SBS transmits the forward control signals of all the base stations to the mobile station at once (the mobile station selects the base station).

An effect obtained by the operation is that the forward control signals of the NSBSs are transmitted to the SBS with a cable through the RNC.

Figure 5:
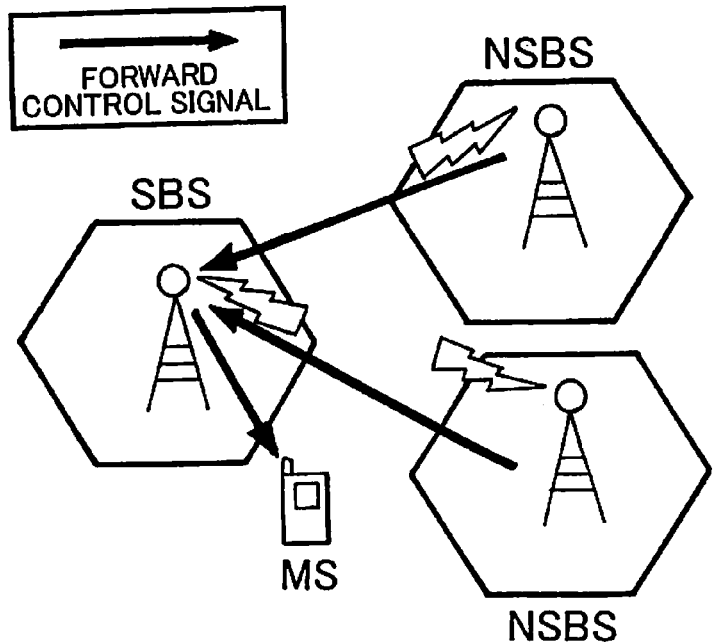
FIG. 5 is an explanatory diagram for a case in which all NSBSs directly transmit forward control signals to an SBS.

5. All the NSBSs directly transmit the forward control signals to the SBS. FIG. 5 is an explanatory diagram of the operation. The SBS selects a new SBS on the basis of the forward control signals of all the base stations and notifies the mobile station of the forward control signals of all the base stations (the SBS selects the base station).

An effect obtained by the operation is that the SBS is required to transmit only synchronization information to the MS as the forward control signal because the SBS selects the base station. For this reason, an amount of information can be reduced in comparison with item 3.

Figure 6:
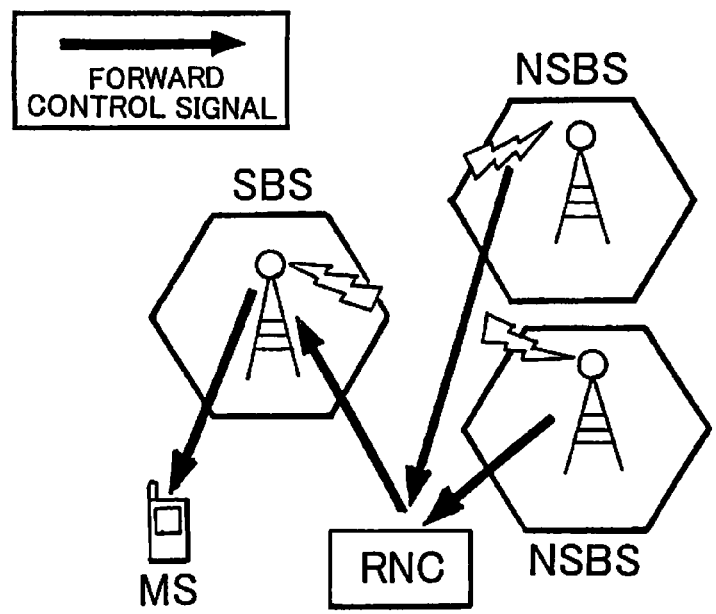
FIG. 6 is an explanatory diagram for a case in which all NSBSs transmit forward control signals to an RNC.

6. All the NSBSs transmit forward control signals to the RNC, and the RNC transmits the forward control signals of all the NSBSs to the SBS. FIG. 6 is an explanatory diagram of the operation. The SBS selects a new SBS on the basis of the forward control signals of all the base stations and notifies the mobile station of the forward control signals of all the base stations (the SBS selects the base station).

An effect obtained by the operation is that the SBS is required to transmit only synchronization information to the MS as a forward control signal. For this reason, an amount of information can be reduced in comparison with item 4.

Figure 7:
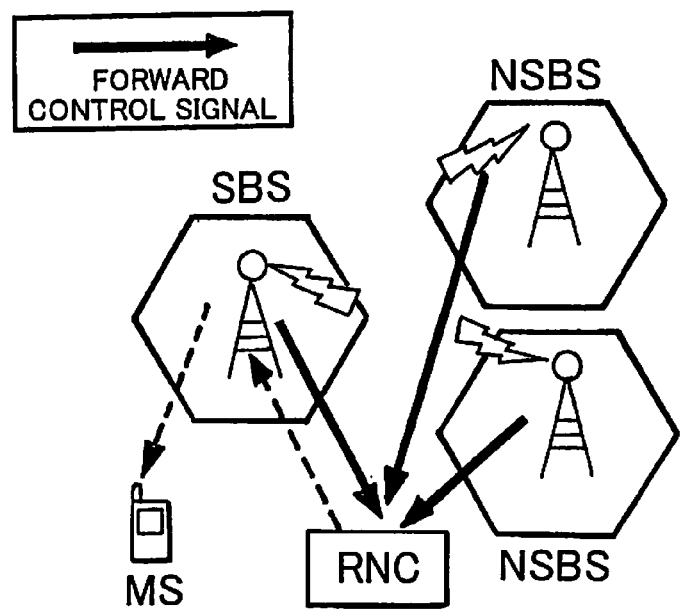
FIG. 7 is an explanatory diagram for a case in which all NSBSs and an SBS transmit forward control signals to an RNC.

7. All the NSBSs and the SBS transmit the forward control signals to the RNC, and the RNC selects a new SBS on the basis of the forward control signals of all the base stations. FIG. 7 is an explanatory diagram of the operation. The RNC transmits the forward control signals of all the base stations to the newly selected SBS. The SBS notifies the mobile station of the forward control signals of all the base stations (the RNC selects the base station).

An effect obtained by the operation is that the SBS is required to transmit only synchronization information to the MS as the forward control signal because the RNC selects the base station. For this reason, an amount of information can be reduced in comparison with item 4.

A transmitting method of a reverse pilot signal will be described below.

8. Reverse pilot signals transmitted from the mobile station to the SBS and the NSBSs are the same reverse pilot signals.

An effect obtained by the operation is that generation and transmission of the reverse pilot signals are maximally easy because the same reverse pilot signals are transmitted by all the base stations.

9. The mobile station changes a transmission timing of reverse pilots to the NSBSs in accordance with the synchronization information of the SBS.

An effect obtained by the operation is that the reverse pilot signals to the NSBSs do not interfere with the SBS because the reverse pilot signals to the NSBSs are always synchronized with the SBS.

10. The mobile station changes a transmission timing of reverse pilots to the NSBSs in accordance with the synchronization information of the NSBSs.

An effect obtained by the operation is that reverse propagation quality obtained when the mobile station is synchronized with the NSBSs can be reliably estimated.

11. The base station is characterized by including a means for estimating reverse propagation quality on the basis of the reverse pilot signal and transmitting the reverse propagation quality including the forward control signal to the mobile station when the mobile station requires the reverse propagation quality.

An effect obtained by the operation is that the mobile station can switch the base stations on the basis of the reverse propagation quality.

A criterion for transmitting the forward control signal will be described below. An effect obtained by the operation is that a transmission frequency of the forward control signal is reduced by setting a criterion for transmitting the forward control signal.

12. The SBS and the NSBS periodically transmit forward control signals to the mobile station.

13. The SBS periodically transmits the forward control signal of the SBS to the mobile station. The SBS and the NSBS transmit the forward control signals to the mobile station when the reverse propagation quality exceeds a threshold value P.

14. The SBS periodically transmits the forward control signal of the SBS to the mobile station. The SBS transmits the forward control signals of the SBS and the NSBS to the mobile station when the reverse propagation quality in the NSBS exceeds the threshold value P.

15. The SBS periodically transmits the forward control signal of the SBS to the mobile station. The mobile station estimates forward propagation quality and transmits request information as the reverse control signal to the SBS when the forward propagation quality exceeds the threshold value P. The SBS and the NSBS transmit the forward control signals to the mobile station when request information is received.

16. The SBS periodically transmits the forward control signal of the SBS to the mobile station. The mobile station estimate the forward propagation quality. When the forward propagation quality corresponding to at least one base station exceeds a threshold value Q, the mobile station transmits request information which requests the forward control signal of the base station corresponding to the forward propagation quality exceeding the threshold value Q from the SBS to the SBS. The SBS receives the request information, and the SBS transmits forward control signals corresponding to the base station corresponding to the request information to the mobile station at once.

A case in which transmission timings of reverse pilot signals are not changed in units of NSBSs will be described below.

17. The SBS periodically transmits the forward control signal of the SBS to the mobile station. When any one of the base station and the mobile station determines to switch SCs, an NSBS (new SBS) having the new switched SC transmits a forward control signal of the new SBS to the mobile station.

18. The SBS periodically transmits the forward control signal of the SBS to the mobile station. When any one of the base station and the mobile station determines to switch SCs, the SBS transmits a forward control signal of the new SBS to the mobile station.

A case in which transmission timings of reverse pilot signals are changed in units of NSBS will be described below.

19. The SBS and the NSBS periodically transmit the forward control signals to the mobile station. When any one of the base station and the mobile station determines to switch SCS, a new SBS transmits a forward control signal of the new SBS to the mobile station.

20. The SBS periodically transmits the forward control signals of the SBS and the NSBS to the mobile station. When any one of the base station and the mobile station determines to switch SCs, the SBS transmits the forward control signal of the new SBS to the mobile station.

21. The mobile station determines to switch SCs and transmits a request of a forward control signal as a reverse control signal.

A method of improving the accuracy of synchronization information will be described below.

22. The mobile station increases at least one of a transmission frequency of a reverse pilot signal, the number of repetitions of transmission, and a transmission power in NSBSs ranked in the top X of propagation quality. Increments are increased in a descending order of propagation quality.

An effect obtained by the operation is that synchronization accuracy to a base station which is probably switched to an SBS is improved.

23. The mobile station increases at least one of a transmission frequency of a reverse pilot signal, the number of repetitions of transmission, and a transmission power in an NSBS the propagation quality of which exceeds a threshold value Y. Increments are increased in a descending order of propagation quality.

An effect obtained by the operation is that synchronization accuracy to a base station which is probably switched to an SBS is improved.

24. The mobile station increases at least one of a transmission frequency of a reverse pilot signal, the number of repetitions of transmission, and a transmission power in NSBSs ranked in the bottom Z of propagation quality. Increments are increased in an ascending order of propagation quality.

An effect obtained by the operation is that synchronization accuracy to all the base stations is increased.

25. The mobile station increases at least one of a transmission frequency of a reverse pilot signal, the number of repetitions of transmission, and a transmission power in an NSBS the propagation quality of which is equal to or less than a threshold value W. Increments are increased in an ascending order of propagation quality.

An effect obtained by the operation is that synchronization accuracy to all the base stations is increased.

Embodiment 1

A wireless communication system to which the present invention is applied is constituted by a plurality of base stations and at least one mobile station. In the following embodiment, to make it easy to understand a correspondence between the base stations and the mobile station, an explanation will be made on the assumption that first to Nth base stations and first to Mth mobile stations are used. For descriptive convenience, each of the first to Nth base stations must serve as any one of a serving as a serving base station (for a mobile station, the base station which communicates with the mobile station) or non-serving base station (for the mobile station, the base station which does not communicate with the mobile station) for each mobile station. However, the same first to Nth base stations do not always serve as serving base stations or non-serving base stations for all the mobile stations. It is assumed that a signal between an ath base station and an ith mobile station in a wireless communication system having N base stations is expressed as an ((i*N)+a)th signal to uniquely specify a signal between a specific base station and a specific mobile station. Reference symbol * is a symbol which means multiplication. The mobile stations, the base stations, and a base station control device realize functions (will be described below) by control programs stored in respectively memories.

In the first embodiment, a mobile station selects a base station, and a criterion for selecting a base station is reverse propagation quality. Forward (Downward) control signals to the moving station are transmitted by all the base stations, the transmission timing is determined by a periodic trigger. Information of the forward control signal transmitted to the mobile station includes synchronization information of the base stations and reverse propagation quality.

Figure 8:
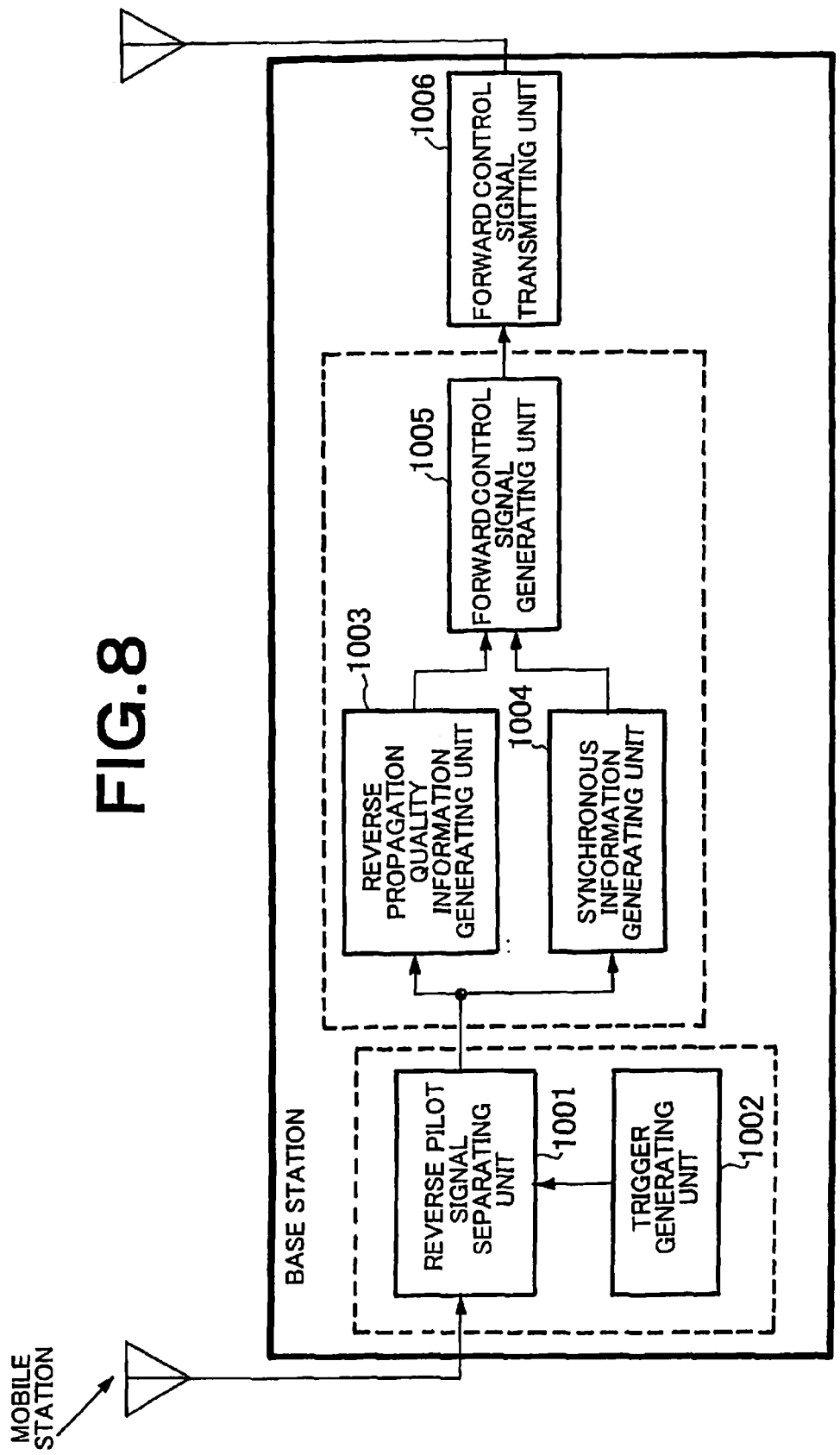
FIG. 8 is a functional block diagram of a base station according to a first embodiment.

FIG. 8 is a functional block diagram of the first to Nth base stations in the first embodiment. A trigger generating unit 1002 periodically generates and outputs a trigger signal. A reverse pilot signal separating unit 1001 separates and outputs a reverse pilot signal from a signal received from an ith mobile station when a trigger signal is input. A reverse propagation quality information generating unit 1003 calculates propagation quality of a reverse link on the basis of a reverse pilot signal and generates and outputs the propagation quality as reverse propagation quality information. A synchronous information generating unit 1004 estimates a reception timing on the basis of a reverse pilot signal and generates and outputs information corresponding to a transmission timing of the ith mobile station at which the ith mobile station is synchronized with the base station as synchronization information. A forward control signal generating unit 1005 generates and outputs the reverse propagation quality information and the synchronization information as forward control information. A forward control signal transmitting unit 1006 transmits the forward control signal as a forward transmission signal. A configuration which gives an output from the trigger generating unit to the forward control signal transmitting unit to transmit the forward control signal at the trigger timing can also be employed. An antenna is used for both transmission and reception, and may also be configured to be switchably connected to a transmission signal and a reception signal.

Figure 9:
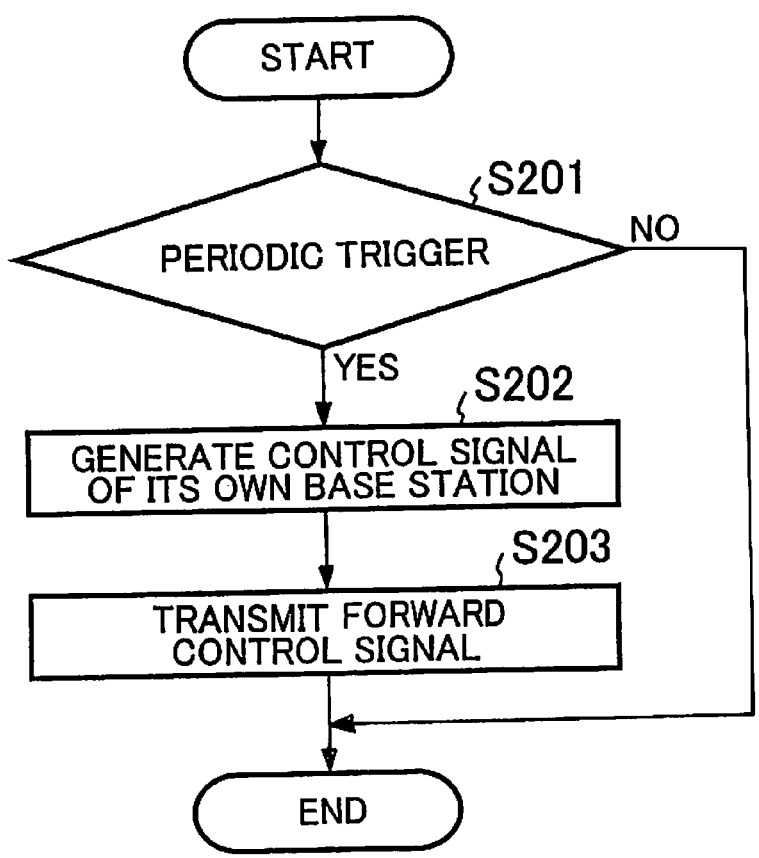
FIG. 9 is a flow chart showing processes of the base station according to the first embodiment.

FIG. 9 is a flow chart showing processes of each of the base stations according to the embodiment. In this case, processes of an ath (a is an arbitrary natural number which is equal to or less than N) base station will be described below.

A periodic trigger generated by the base station in a predetermined cycle is monitored. When the trigger is detected (step S201), a reception timing in an ath base station is estimated on the basis of a pilot signal transmitted by an ith (i is a natural number which is equal to or less than M) mobile station, and ((i*N)+a)th synchronization information to synchronize the ith mobile station with the ath base station is generated (step S202). Reverse propagation quality in the ath base station is estimated, ((i*N)+a)th reverse propagation quality information is generated, the ((i*N)+a)th synchronization information and the ((i*N)+a)th reverse propagation quality information are generated as an ((i*N)+a)th forward control signal, and the ((i*N)+a)th forward control signal is transmitted to the ith mobile station (step S203).

When the trigger is not detected, the processes are ended.

Figure 10:
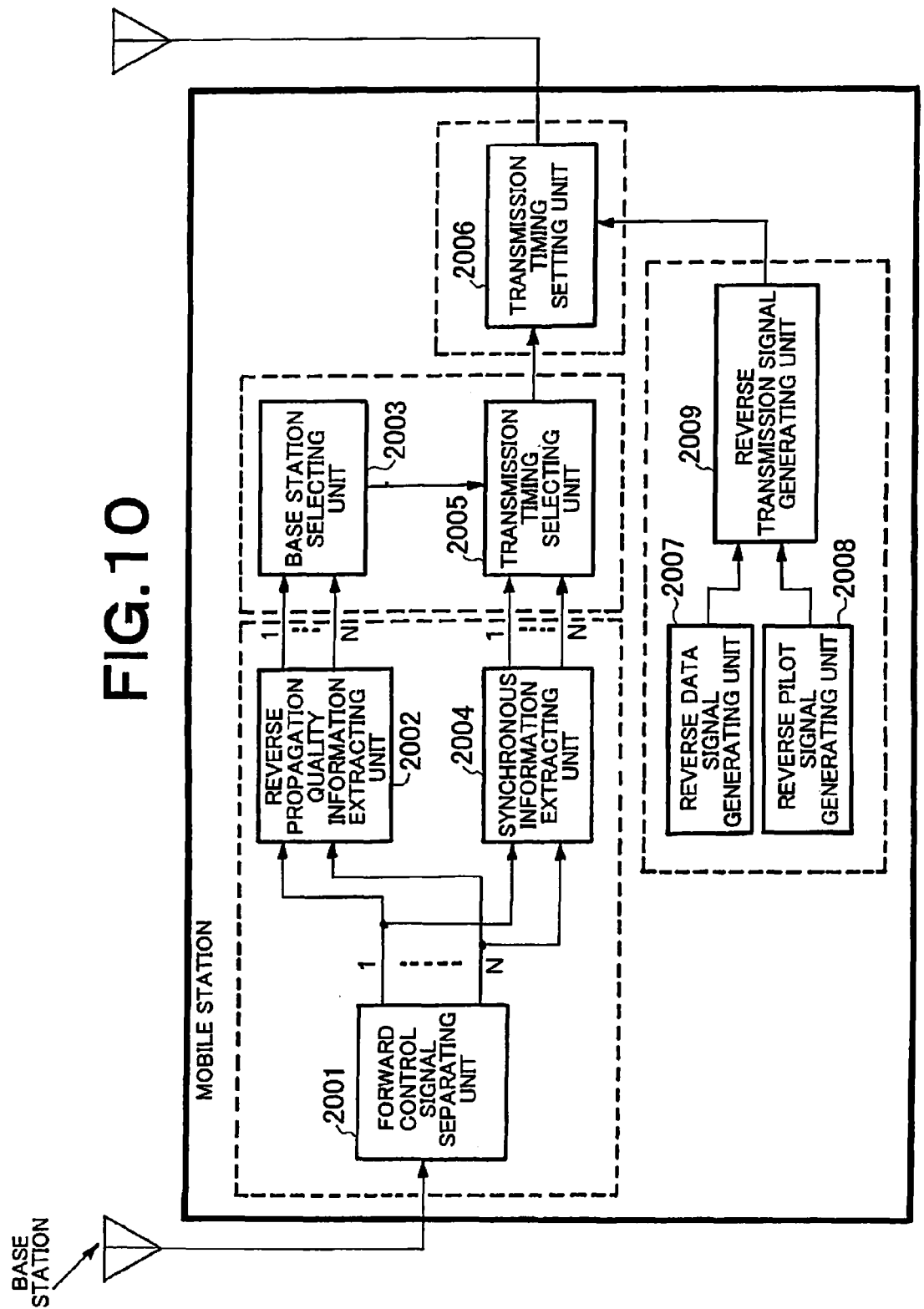
FIG. 10 is a functional block diagram of a mobile station according to the first embodiment.

FIG. 10 is a functional block diagram of the first to Mth mobile stations according to the present embodiment. A forward control signal separating unit 2001 extracts first to Nth control signals from forward link signals transmitted by the first to Nth base stations and outputs the first to Nth control signals. A reverse propagation quality information extracting unit 2002 extracts first to Nth pieces of reverse propagation quality information from the first to Nth control signals and outputs the first to Nth pieces of reverse propagation quality information. A base station selecting unit 2003 generates and outputs information indicating a base station corresponding to the maximum reverse propagation quality as new base station selection information in the first to Nth pieces of reverse propagation quality information. A synchronous information extracting unit 2004 extracts first to Nth pieces of synchronization information from the first to Nth control signals and outputs the first to Nth pieces of synchronization information. A transmission timing selecting unit 2005 selects synchronization information corresponding to new base station selection information from the first to Nth pieces of synchronization information and outputs the synchronization information as new base station synchronization information. A reverse data signal generating unit 2007 generates and outputs a reverse data signal. A reverse pilot signal generating unit 2008 generates and outputs a reverse pilot signal. A reverse transmission signal generating unit 2009 generates and outputs a reverse data signal and a reverse pilot signal as reverse transmission signals. A transmission timing setting unit 2006 transmits the reverse transmission signal such that a transmission timing of the reverse transmission signal is changed to synchronize the mobile station with a newly selected base station on the basis of the new base station synchronization information. An antenna is used for both transmission and reception, and may also be configured to be switchably connected to a transmission signal and a reception signal.

Figure 11:
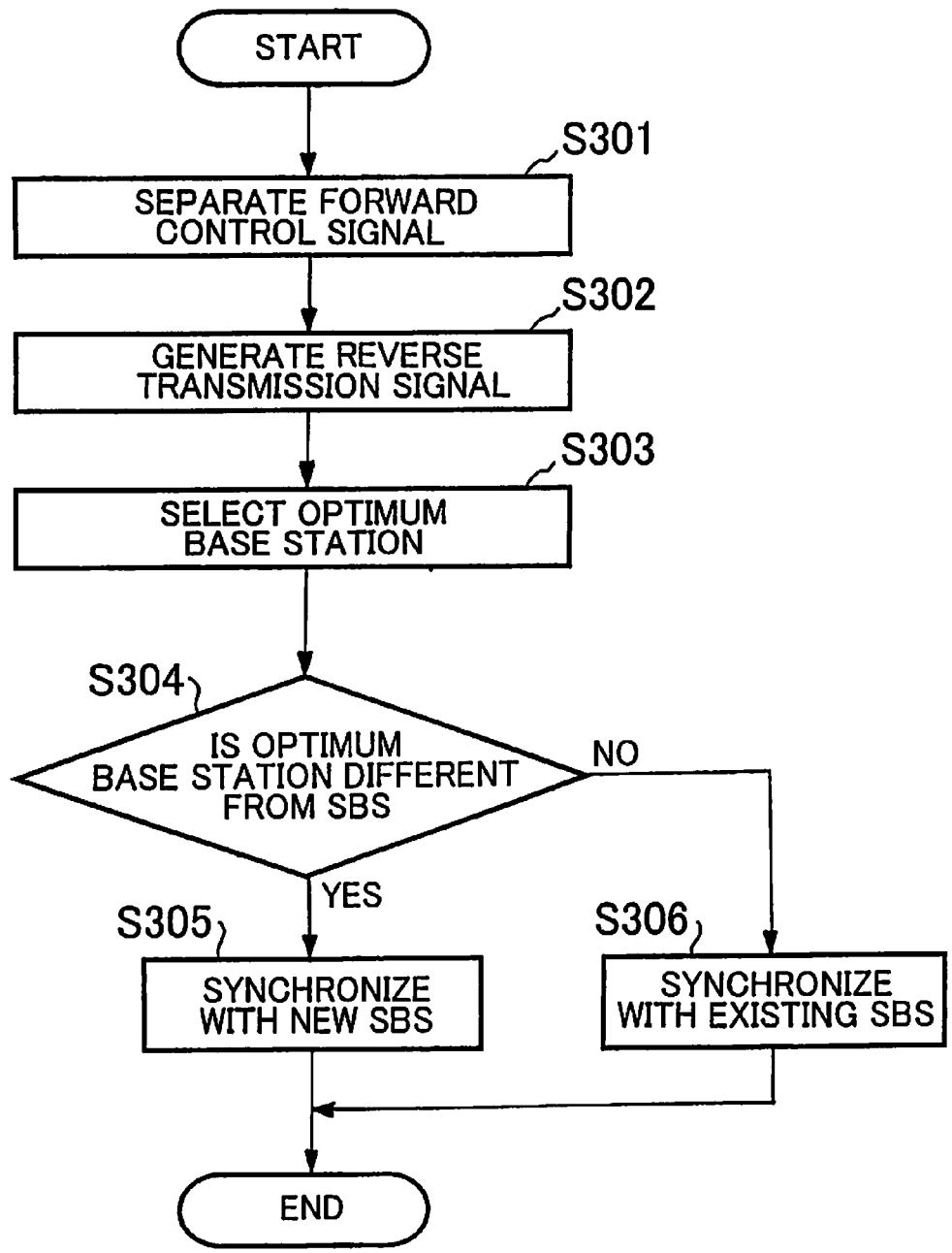
FIG. 11 is a flow chart showing processes of the mobile station according to the first embodiment.

FIG. 11 is a flow chart showing processes of each of the mobile stations in the embodiment. In this case, the processes in the ith mobile station will be described below. However, it is assumed that the first to Mth mobile stations perform the processes along the same flow chart.

The ith mobile station receives $((i*N)+1)$th to $((i*N)+N)$th forward control signals from the first to Nth base stations. First, $((i*N)+1)$th to $((i*N)+N)$th pieces of synchronization information and $((i*N)+1)$th to $((i*N)+N)$th pieces of propagation quality information are separated from the $((i*N)+1)$th to $((i*N)+N)$th forward control signals, respectively (step S301).

An ith reverse data signal and an ith reverse pilot signal are generated, and the ith reverse data signal and the ith reverse pilot signal are generated as ith reverse transmission signals (step S302).

$((i*N)+j)$th (j is a natural number which is equal to or less than N) reverse propagation quality information corresponding to a serving base station, $((i*N)+1)$th to $((i*N)+(j-1))$th pieces of reverse propagation quality information corresponding to non-serving base stations, and $((i*N)+(j+1))$th to $((i*N)+N)$th pieces of reverse propagation quality information are compared with each other. When any one of the $((i*N)+1)$th to $((i*N)+(j-1))$th pieces of reverse propagation quality information and the $((i*N)+(j+1))$th to $((i*N)+N)$th pieces of reverse propagation quality information exceeds the $((i*N)+j)$th reverse propagation quality information (step S304), on the basis of the maximum $((i*N)+s)$th synchronization information, corresponding to an sth base station, in the $((i*N)+1)$th to $((i*N)+(j-1))$th pieces of reverse propagation quality information and the $((i*N)+(j+1))$th to $((i*N)+N)$th pieces of reverse propagation quality information, the ith reverse transmission signal is transmitted such that a transmission timing of the ith reverse transmission signal is changed to synchronize the ith mobile station with the sth base station (step S305). When the $((i*N)+j)$th reverse propagation quality information is equal to or higher than the $((i*N)+1)$th to $((i*N)+(j-1))$th pieces of reverse propagation quality information and the $((i*N)+(j+1))$th to $((i*N)+N)$th pieces of reverse propagation quality information (step S304), the ith reverse transmission signal is transmitted such that the transmission timing of the ith reverse transmission signal is changed on the basis of $((i*N)+j)$th synchronization information to synchronize the ith mobile station with a jth base station (step S306).

In this manner, according to the embodiment, when the base station determined to switch the base stations, the mobile station can be synchronized with the destination base station.

Embodiment 2

In a second embodiment, a serving base station selects a base station, and a criterion for selecting a base station is reverse propagation quality. A forward control signal to a mobile station is transmitted by the serving base station. When the transmission timing is a timing when the serving base station determines to switch base stations, information of a forward control signal transmitted to the mobile station is synchronization information of a destination base station. When the transmission timing is a timing when a periodic trigger is detected, information of the forward control signal transmitted to the mobile station is synchronization information of the serving base station.

Figure 12:
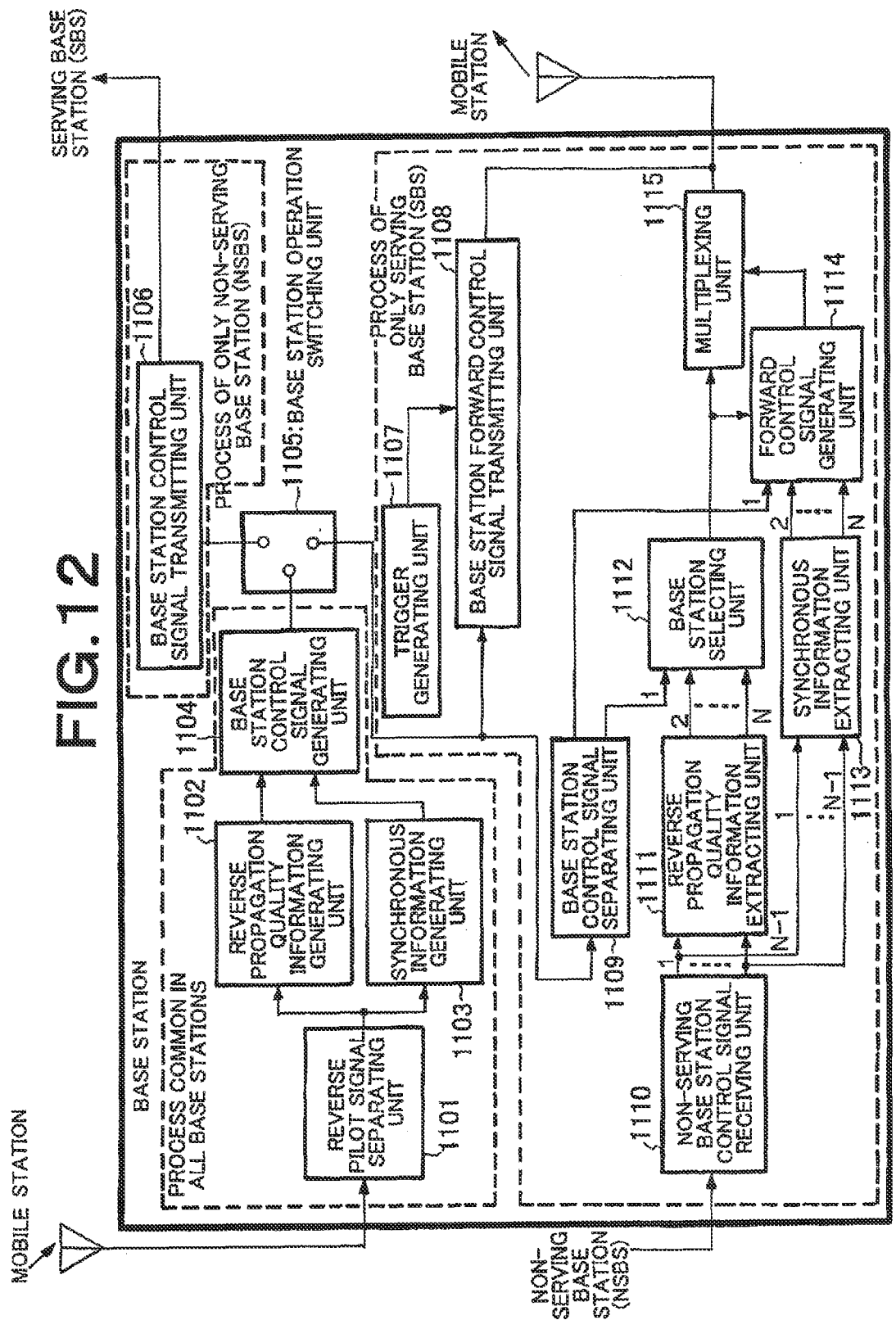
FIG. 12 is a functional block diagram of a base station according to a second embodiment.

FIG. 12 is a functional block diagram of first to Nth base stations according to the second embodiment. A reverse pilot signal separating unit 1101 separates a reverse pilot signal from a signal transmitted by an ith mobile station and outputs the reverse pilot signal. A reverse propagation quality information generating unit 1102 estimates propagation quality of a reverse link on the basis of the reverse pilot signal, and generates and outputs the propagation quality as reverse propagation quality information. A synchronous information generating unit 1103 estimates a reception timing on the basis of the reverse pilot signal and generates and outputs information corresponding to a transmission timing of the ith mobile station at which the ith mobile station is synchronized with the base station as synchronization information. A base station control signal generating unit 1104 of its own base station generates and outputs reverse propagation quality information and the synchronization information as a base station control signal of its own base station. A base station operation switching unit 1105 switches operations depending on whether the own base station is a base station which is being connected with the mobile station. A base station control signal transmitting unit 1106 of its own base station transmits a base station control signal of its own base station as a base station control transmission signal of its own base station.

A trigger generating unit 1107 periodically generates a trigger signal. A base station forward control signal transmitting unit 1108 of its own base station transmits the base station control signal of its own base station to the mobile station as a base station forward control transmission signal of its own base station when the trigger signal is received. A base station control signal separating unit 1109 of its own base station separates reverse propagation quality information and synchronization information from the base station control signal of its own base station and outputs the reverse propagation quality information and the synchronization information. A non-serving base station control signal receiving unit 1110 separates and outputs control signals of all the non-serving base stations in signals received from all the non-serving base stations. A reverse propagation quality information extracting unit 1111 separates and outputs reverse propagation quality information in the control signal of the non-serving base station. A base station selecting unit 1112 selects an optimum base station on the basis of the pieces of reverse propagation quality information of all the base stations and generates and outputs information representing the base station as optimum base station selection information. A synchronous information extracting unit 1113 separates and outputs synchronization information in a control signal of a non-serving base station. When the base station indicated by the optimum base station selection information is different from the serving base station, a forward control signal generating unit 1114 generates an outputs synchronization information corresponding to the base station indicated by the optimum base station selection information as a forward control signal. A multiplexing unit 1115 multiplexes the forward control signal and the optimum base station selection information and transmits a multiplexed signal as the forward transmission signal. An antenna is used for both transmission and reception, and may also be configured to be switchably connected to a transmission signal and a reception signal.

Figure 13:
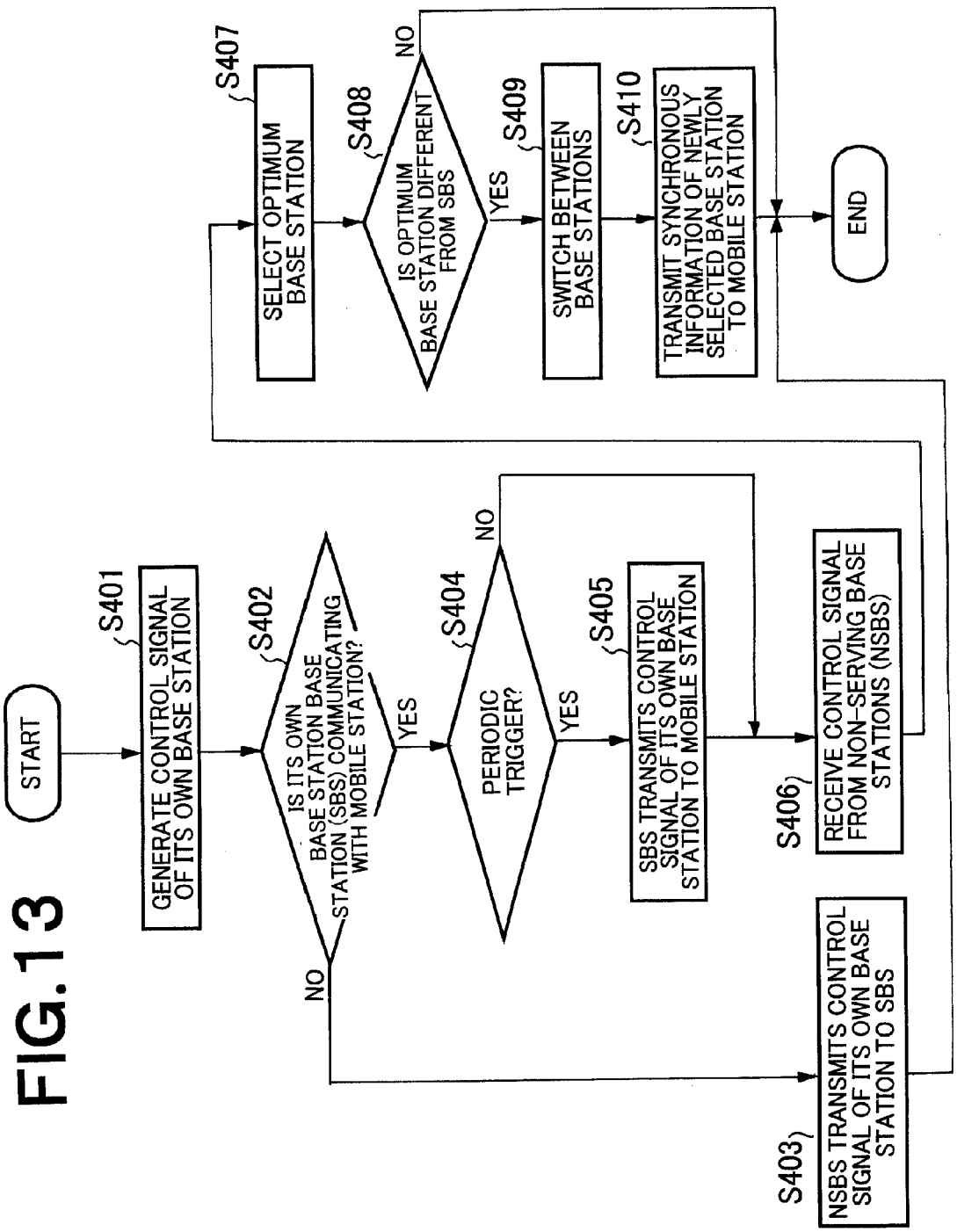
FIG. 13 is a flow chart showing processes of the base station according to the second embodiment.

FIG. 13 is a flow chart showing processes of the first to Nth base stations according to the embodiment. Reverse propagation quality in its own base station is estimated to generate reverse propagation quality information. A reception timing in the own base station is estimated to generate synchronization information to synchronize the mobile station with the own base station. The reverse propagation quality information and the synchronization information are generated as base station control information of its own base station (step S401). It is checked whether the own base station is a base station which is being connected to the mobile station. When the own base station is the base station (SBS) which is being connected to the mobile station, the control operation shifts to step S404. When the base station is a non-serving base station (NSBS) which is not being connected to the mobile station, the control operation shifts to step S403 (step S402). The NSBS transmits control information of the own base station to the SBS (step S403).

A trigger signal periodically generated by the SBS is monitored by the SBS. When the SBS detects the trigger signal, the control operation shifts to step S405. When the SBS does not detect the trigger signal, the control operation shifts to step S406 (step S404). The SBS transmits control information of the own base station to the mobile station as a base station forward control signal of its own base station (step S405). A control signal is received from the NSBS, and the reverse propagation quality information and the synchronization information are separated and output (step S406). On the basis of pieces of reverse propagation quality information of all the base stations, an optimum base station is selected, and information indicating an optimum base station is generated as optimum base station selection information (step S407). When the base station indicated by the optimum base station selection information is different from the SBS, the control operation shifts to step S409. When the base station indicated by the optimum base station selection information is the same as the SBS, the processes are ended (step S408). The base station connected to the mobile station is switched to the base station indicated by the optimum base station selection information (step S409). The synchronization information corresponding to the base station indicated by the optimum base station selection information is generated as a forward control signal. A signal obtained by multiplexing the forward control signal and the optimum base station selection information is transmitted to the mobile station as a forward transmission signal (S410).

The processes in the first to Nth base stations will be further described below such that the processes are divided into processes in the first to (j−1)th base stations serving as non-serving base stations which are handover destinations and the (j+1)th to Nth base stations (j is a natural number which is N or less except for j) and processes in the jth base station serving as a serving base station which is a handover source.

In a sth (s is a natural number which is N or less) base station serving as a non-serving base station, a reception timing in the sth base station is estimated on the basis of a pilot signal transmitted by the ith mobile station, and the ((i*N)+s)th synchronization information to synchronize the ith mobile station with the sth base station is generated. Reverse propagation quality in the sth base station is estimated to generate ((i*N)+s)th reverse propagation quality information, the ((i*N)+s)th synchronization information and the ((i*N)+s)th reverse propagation quality information are generated as an ((i*N)+s)th forward control signal and transmitted to the jth base station.

In the jth base station serving as a serving base station, the ((i*N)+1)th to ((i*N)+(j−1))th forward control signals and the ((i*N)+(j+1))th to ((i*N)+N)th forward control signals respectively transmitted by the first to (j−1)th base stations and the (j+1)th to Nth base stations are received, and the ((i*N)+1)th to ((i*N)+(j−1))th pieces of synchronization information, the ((i*N)+(j+1))th to ((i*N)+N)th pieces of synchronization information, the ((i*N)+1)th to ((i*N)+(j−1))th pieces of reverse propagation quality information, and the ((i*N)+(j+1))th to ((i*N)+N)th pieces of reverse propagation quality information are separately output.

On the basis of the pilot signal transmitted by the ith mobile station, a reception timing in the jth base station is estimated, and ((i*N)+j)th synchronization information to synchronize the ith mobile station with the jth base station is generated. Reverse propagation quality in the jth base station is estimated, ((i*N)+j)th reverse propagation quality information is generated, and the ((i*N)+j)th synchronization information and the ((i*N)+j)th reverse propagation quality information are generated as a ((i*N)+j)th forward control signal.

The jth reverse propagation quality information corresponding to the serving base station is compared with the ((i*N)+1)th to ((i*N)+(j−1))th pieces of reverse propagation quality information and the ((i*N)+(j+1))th to ((i*N)+N)th pieces of reverse propagation quality information corresponding to the non-serving base stations, respectively. When the ((i*N)+s)th reverse propagation quality information which exceeds the jth reverse propagation quality information is detected, base stations are switched, and information indicating the destination base station is generated.

Information indicating the destination base station and the first to Nth control signals are transmitted to the ith mobile station.

Figure 14:
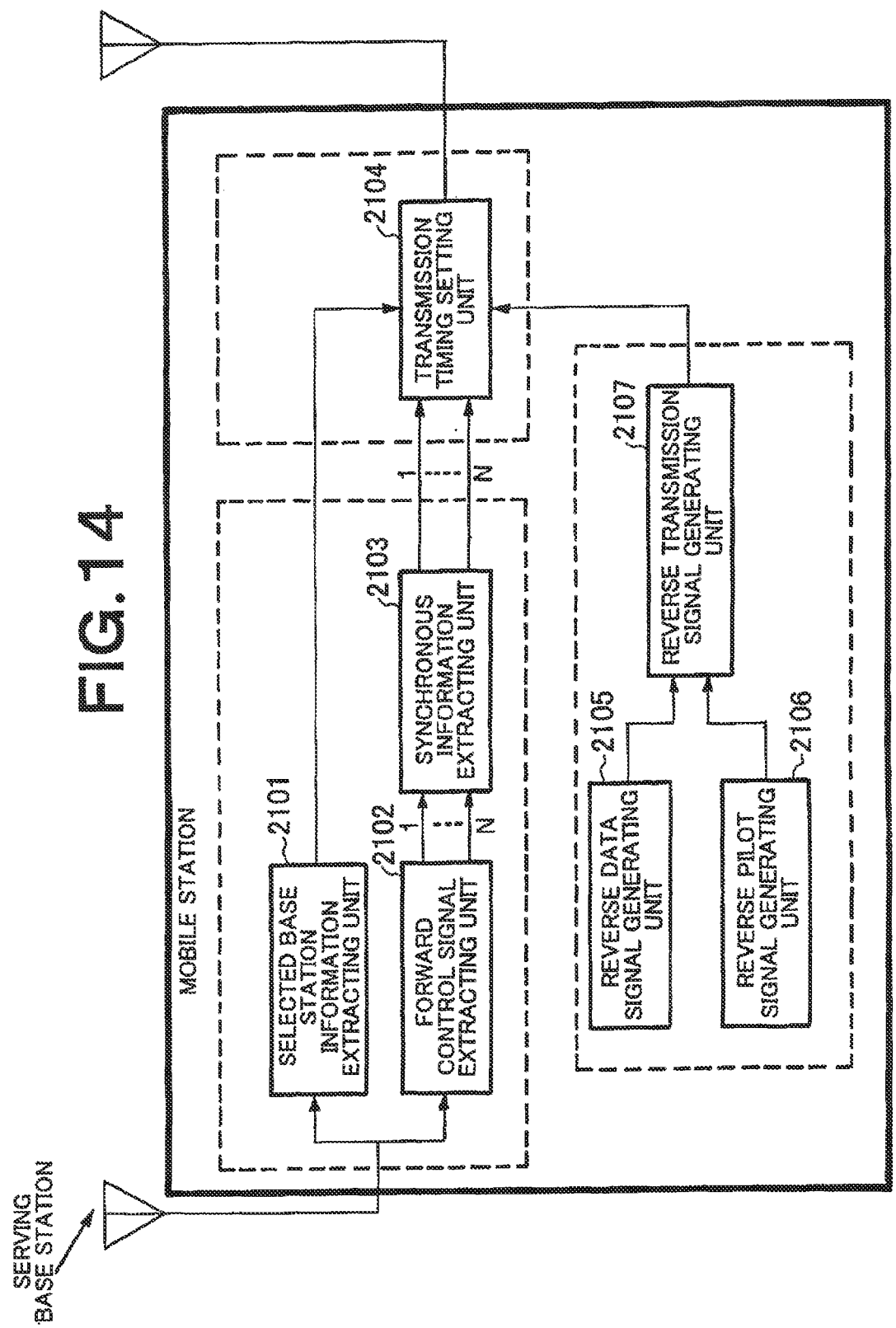
FIG. 14 is a functional block diagram of a mobile station according to the second embodiment.

FIG. 14 is a functional block diagram of the first to Mth mobile stations according to the embodiment. A selected base station information extracting unit 2101 extracts new base station selection information indicating a newly selected base station from a transmitted signal from the serving base station and outputs the new base station selection information. A forward control signal extracting unit 2102 extracts forward control signals of all the base stations from the transmitted signal from the serving base station and outputs the forward control signals. A synchronous information extracting unit 2103 extracts pieces of synchronization information of all the base stations from the forward control signals of all the base stations and outputs the pieces of synchronization information.

A reverse data signal generating unit 2105 generates and outputs a reverse data signal. A reverse pilot signal generating unit 2106 generates and outputs a reverse pilot signal. A reverse transmission signal generating unit 2107 generates and outputs the reverse data signal and the reverse pilot signal as reverse generating signals. A transmission timing setting unit 2104 transmits the reverse generating signals such that a transmission timing is changed on the basis of the new base station selection information to synchronize the mobile station with a newly selected base station. An antenna is used for both transmission and reception, and may also be configured to be switchably connected to a transmission signal and a reception signal.

Figure 15:
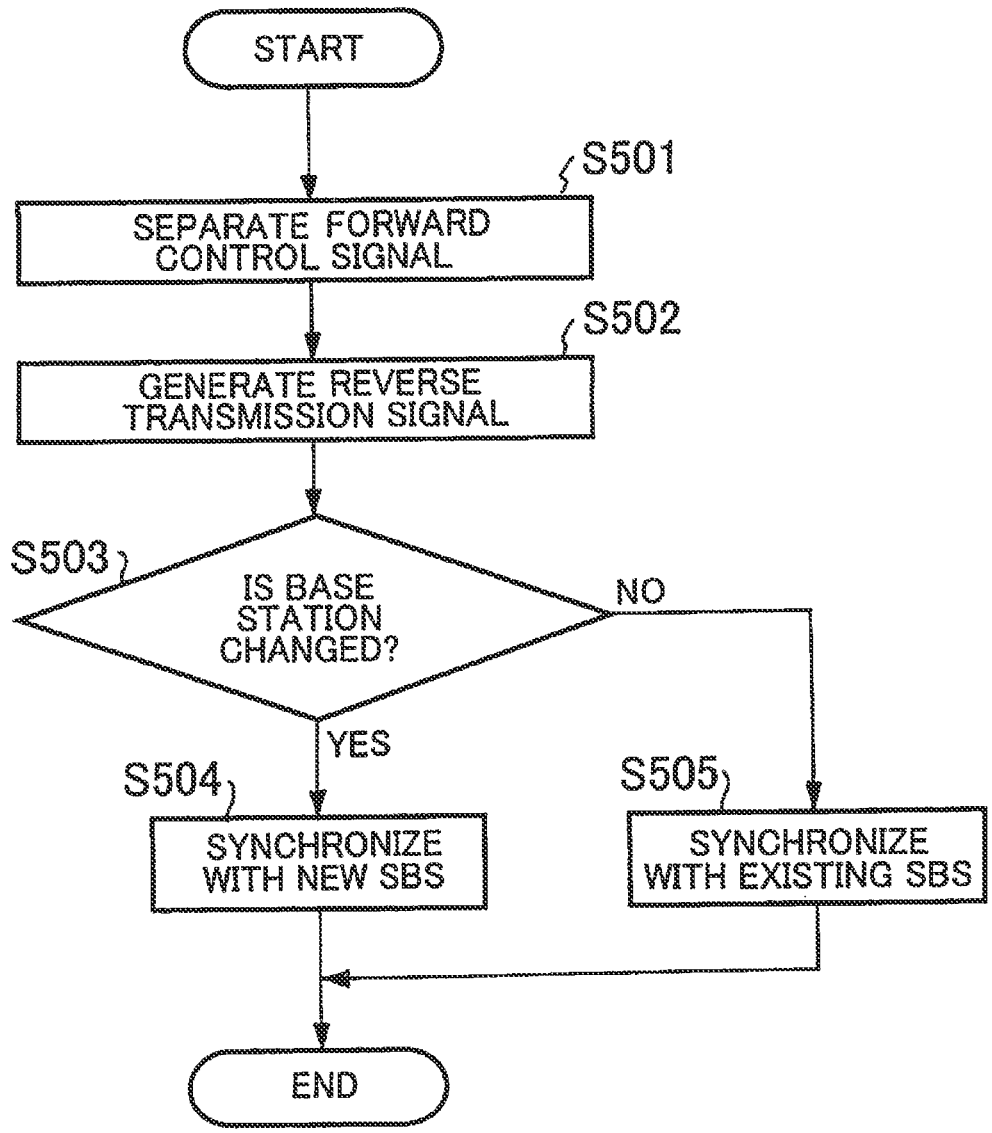
FIG. 15 is a flow chart showing processes of the mobile station according to the second embodiment.

FIG. 15 is a flow chart showing processes in the first to Mth mobile stations according to the embodiment. Processes in the ith mobile station will be described below.

The ith mobile station receives information indicating a destination base station and the ((i*N)+1)th to ((i*N)+N)th forward control signals from the jth base station. First, the ((i*N)+1)th to ((i*N)+N)th pieces of synchronization information and the ((i*N)+1)th to ((i*N)+N)th pieces of propagation quality information are separated from the ((i*N)+1)th to ((i*N)+N)th forward control signals, respectively (step S501).

An ith reverse data signal and an ith reverse pilot signal are generated as ith reverse transmission signals (step S502).

When the information indicating the destination base station changes the base station into the sth (s is a natural number which is N or less except for j) base station (step S503), the ith reverse transmission signal is transmitted such that a transmission timing of the ith reverse transmission signal is changed on the basis of the ((i*N)+s)th synchronization information to synchronize the ith mobile station with the sth base station (step S504). When the information indicating the destination base station indicates the same base station as the jth base station serving as a serving base station (step S503), the transmission timing of the ith reverse transmission signal is changed on the basis of the ((i*N)+j)th synchronization information to synchronize the ith mobile station with the jth base station (step S505).

In this manner, according to the embodiment, when the mobile station determined to switch the base stations, the mobile station can be synchronized with the destination base station.

Embodiment 3

In a third embodiment, a mobile station selects a base station, and a criterion for selecting a base station is reverse propagation quality. When a forward control signal to a mobile station is transmitted by a base station having reverse propagation quality exceeding a threshold value, a transmission timing of the forward transmission signal is a timing when the reverse propagation quality exceeds the threshold value, and information of the forward transmission signal transmitted to the mobile station includes pieces of synchronization information of the base stations and reverse propagation quality information. When the forward transmission signal to the mobile station is transmitted by a serving base station (SBS), a transmission timing of the forward transmission signal is a timing when a periodic trigger is detected, and information of the forward transmission signal transmitted to the mobile station includes synchronization information of the serving base station and the reverse propagation quality information.

Figure 16:
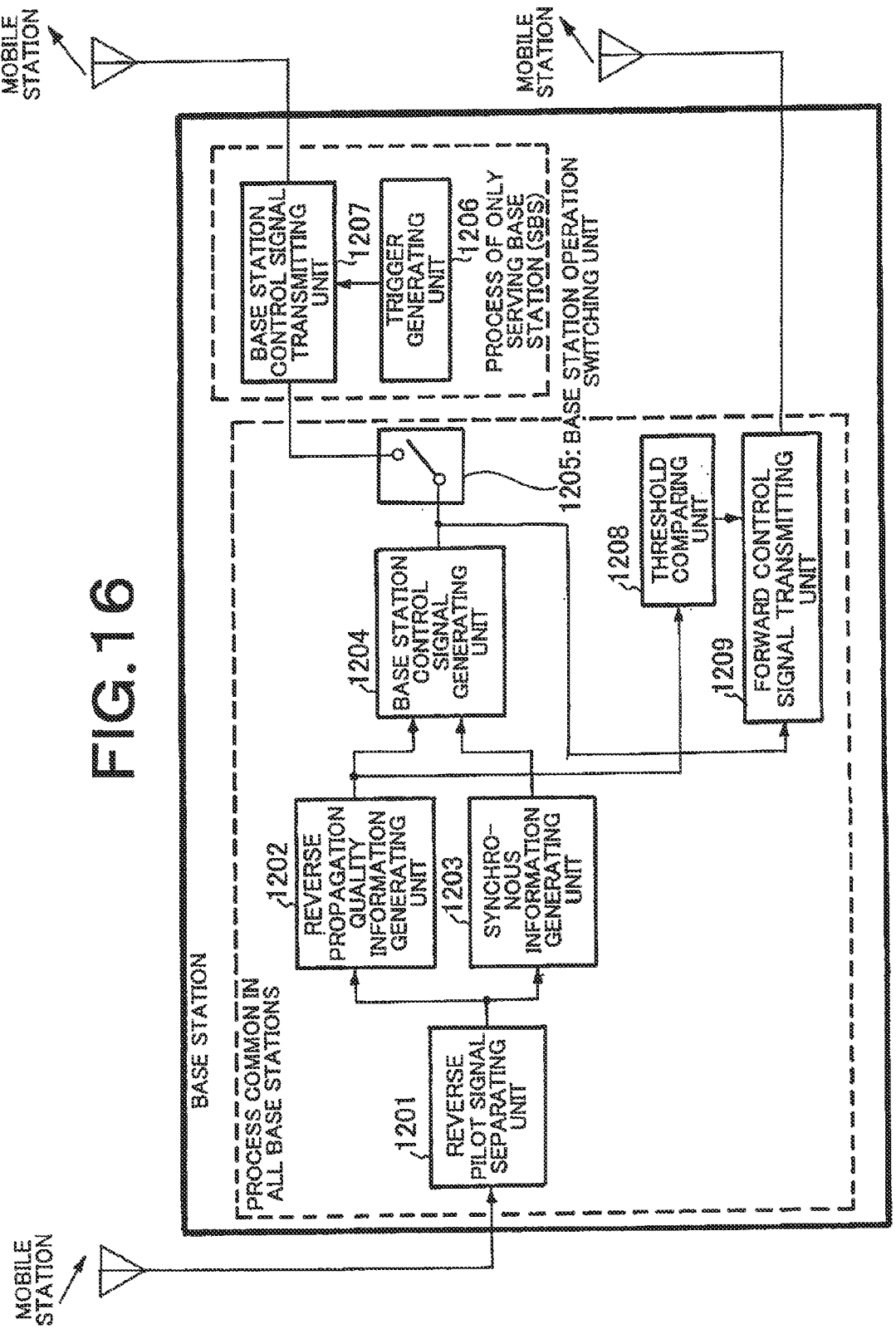
FIG. 16 is a functional block diagram of a base station according to a third embodiment.

FIG. 16 is a functional block diagram of first to Nth base stations according to the third embodiment. A reverse pilot signal separating unit 1201 separates a reverse pilot signal from a signal transmitted by an ith mobile station and outputs the reverse pilot signal. A reverse propagation quality information generating unit 1202 estimates propagation quality of a reverse link on the basis of the reverse pilot signal, and generates and outputs the propagation quality as reverse propagation quality information. A synchronous information generating unit 1203 estimates a reception timing on the basis of the reverse pilot signal and generates and outputs information corresponding to a transmission timing of the ith mobile station at which the ith mobile station is synchronized with the base station as synchronization information. A base station control signal generating unit 1204 of its own base station generates and outputs reverse propagation quality information and the synchronization information as a base station control signal of its own base station. A threshold comparing unit 1208 compares the reverse propagation quality information with a threshold value. When the reverse propagation quality information exceeds the threshold value, the threshold comparing unit 1208 generates and outputs a trigger signal. A forward control signal transmitting unit 1209 transmits a base station control signal of its own base station to the mobile station as a forward control signal when the forward control signal transmitting unit 1209 receives the trigger signal. A base station operation switching unit 1205 switches operations depending on whether the own base station is a base station (SBS) which is being connected to the mobile station.

A trigger generating unit 1206 periodically generates a trigger signal. A base station control signal transmitting unit 1207 of its own base station transmits the base station control signal of its own base station to the mobile station as a base station forward control signal of its own base station when the trigger signal is received. An antenna is used for both transmission and reception, and may also be configured to be switchably connected to a transmission signal and a reception signal.

Figure 17:
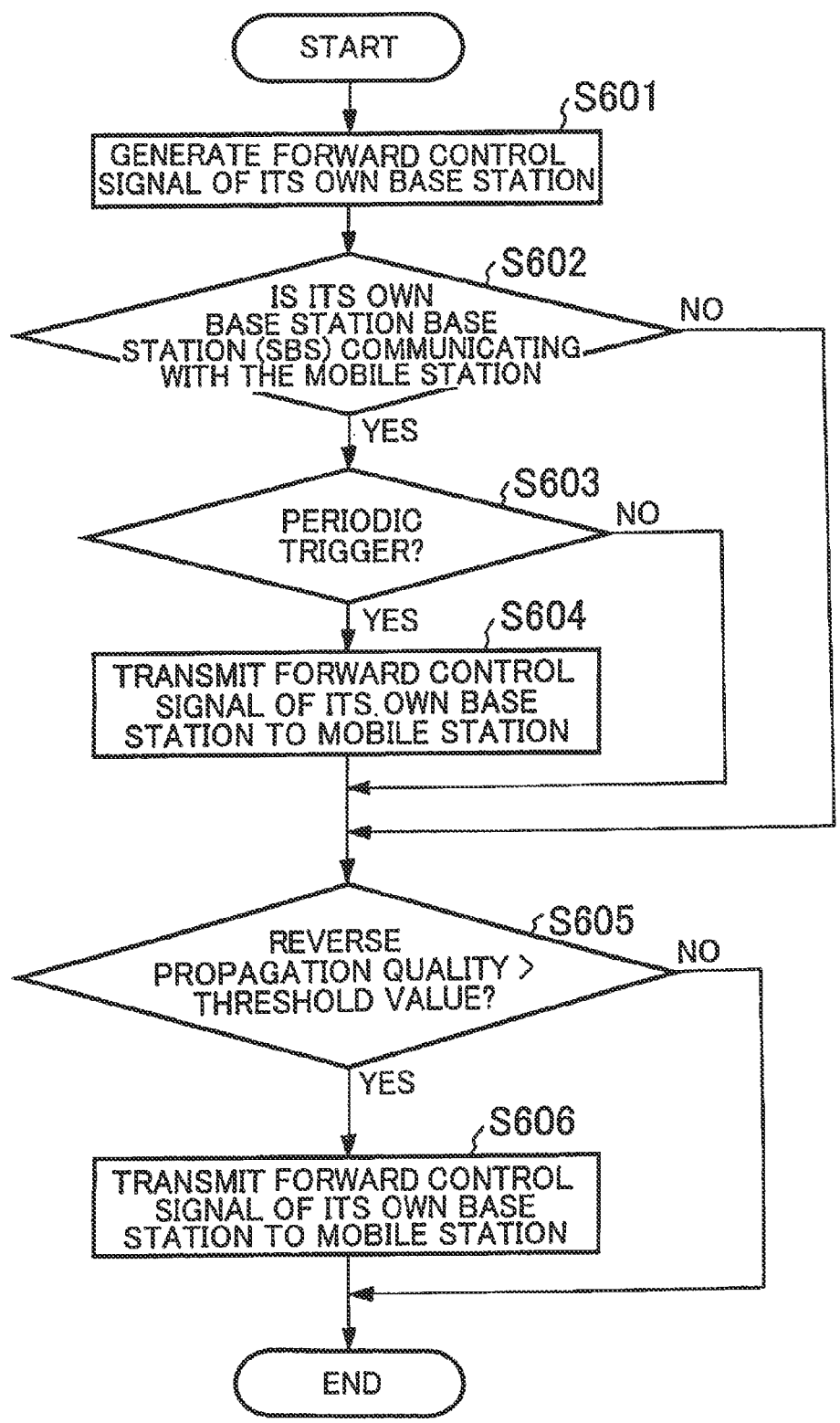
FIG. 17 is a flow chart showing processes of the base station according to the third embodiment.

FIG. 17 is a flow chart showing processes of the first to Nth base stations according to the embodiment. A reverse pilot signal transmitted by the mobile station to the own base station is separated from a reception signal. On the basis of the reverse pilot signal, reverse propagation quality is estimated and output as reverse propagation quality information. On the basis of the reverse pilot signal, a reception timing is estimated, and information to synchronize the mobile station with the base station is output as synchronization information. The reverse propagation quality information and the synchronization information are output as forward control information (step S601). It is checked whether the own base station is a base station which is being connected to the mobile station. When the own base station is the base station (SBS) which is being connected to the mobile station, the control operation shifts to step S603. When the base station is a base station (NSBS) which is not being connected to the mobile station, the control operation shifts to step S605 (step S602). A trigger signal periodically generated by the SBS is monitored by the SBS. When the SBS detects the trigger signal, the control operation shifts to step S604. When the SBS does not detect the trigger signal, the control operation shifts to step S605 (step S603). The forward control signal is transmitted to the mobile station (step S604). The reverse propagation quality information and the threshold value are compared with each other. When the reverse propagation quality exceeds the threshold value, the control operation shifts to step S606. When the reverse propagation quality is equal to or less than the threshold value, the processes are ended (step S605). The forward control signal is transmitted to the mobile station (step S606).

The processes in the first to Nth base stations will be further described below such that the processes are divided into processes in the first to (j−1)th base stations serving as non-serving base stations which are handover destinations and the (j+1)th to Nth base stations (j is a natural number which is N or less) and processes in the jth base station serving as a serving base station which is a handover source.

In a sth (s is a natural number which is N or less except for j) base station serving as a non-serving base station, a reception timing in the sth base station is estimated on the basis of a pilot signal transmitted by the ith mobile station, and the $((i*N)+s)$th synchronization information to synchronize the ith mobile station with the sth base station is generated. Reverse propagation quality in the sth base station is estimated to generate $((i*N)+s)$th reverse propagation quality information, the $((i*N)+s)$th synchronization information and the $((i*N)+s)$th reverse propagation quality information are generated as an $((i*N)+s)$th forward control signal and transmitted to the jth base station.

In the jth base station serving as a serving base station, on the basis of the pilot signal transmitted by the ith mobile station, the reception timing in the jth base station is estimated, and the $((i*N)+j)$th synchronization information to synchronize the ith mobile station with the jth base station is generated. Reverse propagation quality in the jth base station is estimated, and $((i*N)+j)$th reverse propagation quality information is generated. The $((i*N)+j)$th synchronization information and the $((i*N)+j)$th reverse propagation quality information are generated as $((i*N)+j)$th forward control signal.

The $((i*N)+1)$th to $((i*N)+(j-1))$th forward control signals and the $((i*N)+(j+1))$th to $((i*N)+N)$th forward control signals respectively transmitted by the first to $(j-1)$th base stations and the $(j+1)$th to Nth base stations are received, and the $((i*N)+1)$th to $((i*N)+(j-1))$th pieces of synchronization information, the $((i*N)+(j+1))$th to $((i*N)+N)$th pieces of synchronization information, the $((i*N)+1)$th to $((i*N)+(j-1))$th pieces of reverse propagation quality information, and the $((i*N)+(j+1))$th to $((i*N)+N)$th pieces of reverse propagation quality information are separately output.

The non-serving base stations are sequentially selected one by one. When reverse propagation quality indicated by the $((i*N)+s)$th reverse propagation quality information corresponding to the sth base station selected in the previous step exceeds a threshold value U, the $((i*N)+s)$th forward control signal corresponding to the sth base station is determined to be transmitted to the ith mobile station.

Even though the reverse propagation quality is equal to or less than the threshold value U, when a trigger periodically generated is detected, the $((i*N)+s)$th forward control signal corresponding to the sth base station is determined to be transmitted to the ith mobile station.

When it is checked that all the non-serving base stations are selected, a forward control signal corresponding to a determined non-serving base station is transmitted to the ith mobile station.

Figure 18:
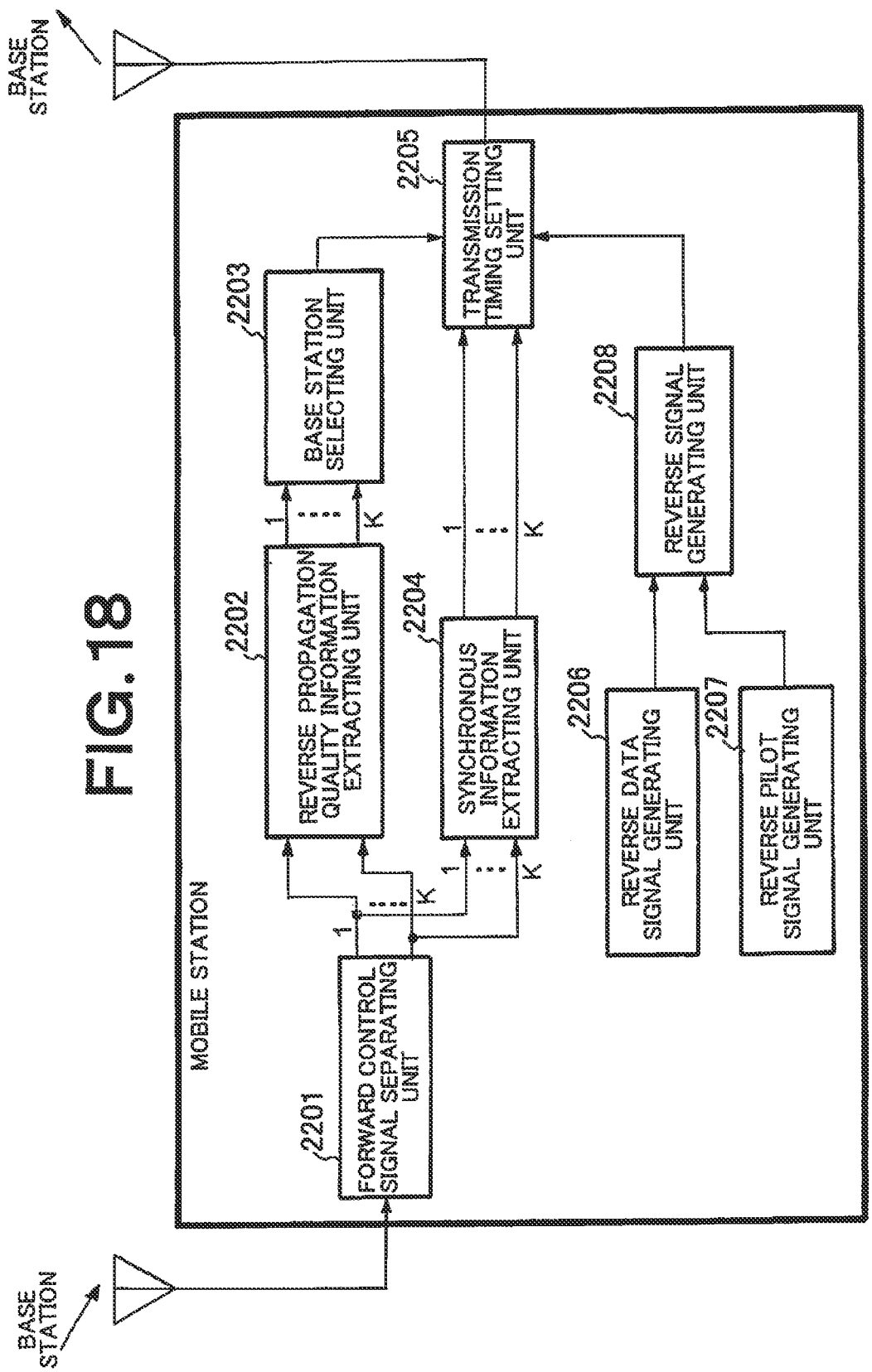
FIG. 18 is a functional block diagram of a mobile station according to the third embodiment.

FIG. 18 is a functional block diagram of first to Mth mobile stations according to the embodiment. A forward control signal separating unit 2201 separates and outputs all forward control signals received from K (K is a natural number which is N or less) base stations. A reverse propagation quality information extracting unit 2202 extracts first to Kth pieces of reverse propagation quality information from the first to Kth forward control signals and outputs the first to Kth pieces of reverse propagation quality information. A base station selecting unit 2203 selects an optimum base station on the basis of the pieces of reverse propagation quality information of all the base stations, and generates and outputs information indicating the base station as optimum base station selection information. A synchronous information extracting unit 2204 extracts first to Kth pieces of synchronization information from the first to Kth forward control signals, respectively, and outputs the first to Kth pieces of synchronization information. A reverse data signal generating unit 2206 generates and outputs a reverse data signal. A reverse pilot signal generating unit 2207 generates and outputs a reverse pilot signal. A reverse signal generating unit 2208 generates and outputs the reverse data signal and the reverse pilot signal.

A transmission timing setting unit 2205 changes a transmission timing of the reverse data signal on the basis of new base station selection information to synchronize the mobile station with a base station corresponding to the new base station selection information. Transmission timings of the reverse pilot signals transmitted to the base stations corresponding to the first to Kth pieces of synchronization information are changed to synchronize the mobile station with the base stations. With respect to base stations except for the base station indicated by the new base station selection information, transmission powers of reverse pilot signals transmitted to base stations ranked in the top X (X is a natural number which is K or less) of reverse propagation quality are set to be high in proportion to the reverse propagation properties. The mobile station transmits the reverse data signal to the base station corresponding to the new base station selection information and transmits the reverse pilot signals to the base stations corresponding to the first to Kth pieces of synchronization information, respectively. An antenna is used for both transmission and reception, and may also be configured to be switchably connected to a transmission signal and a reception signal.

Figure 19:
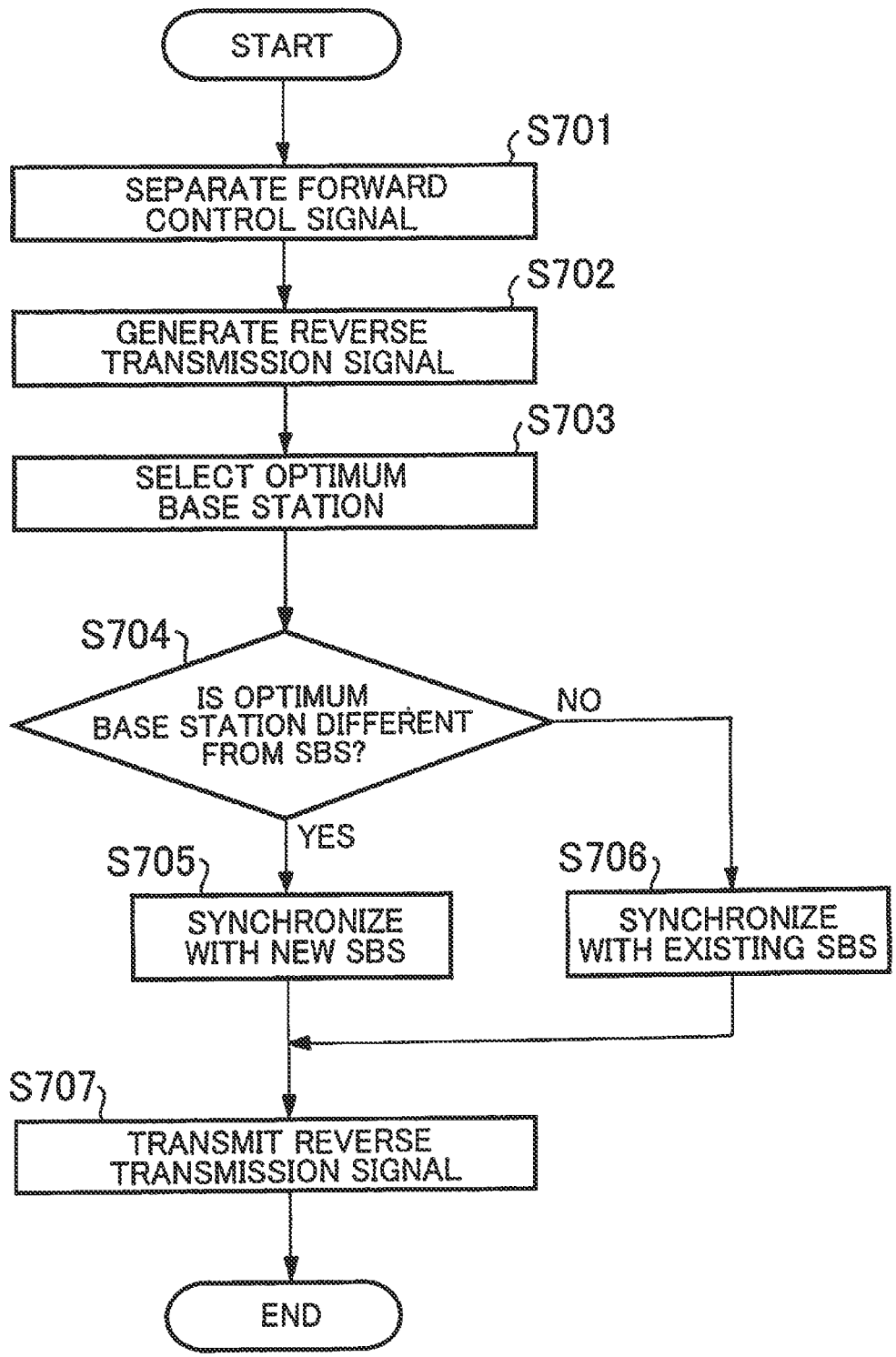
FIG. 19 is a flow chart showing processes of the mobile station according to the third embodiment.

FIG. 19 is a flow chart showing processes in the first to Mth mobile stations according to the embodiment. The mobile stations receive first to Kth forward control signals transmitted by K base stations. The first to Kth pieces of reverse propagation quality information and the first to Kth pieces of synchronization information are separated from the first to Kth forward control signals and output (step S701). A reverse data signal and first to Kth reverse pilot signals are generated and output as reverse signals (step S702). On the basis of the first to Kth pieces of reverse propagation quality information, an optimum base station is selected. Information indicating the optimum base station is generated as optimum base station selection information (step S703). When the base station indicated by the optimum base station selection information is different from a base station (SBS) which is being connected to the mobile station, the control operation shifts to step 705. The base station indicated by the optimum base station selection information is the same as the SBS, the control operation shifts to step S706 (step S704).

On the basis of synchronization information corresponding to a newly selected base station, a transmission timing of the reverse data signal is changed to synchronize the mobile station with the newly selected base station. On the basis of the first to Kth pieces of synchronization information, transmission timings of the first to Kth reverse pilot signals are changed to synchronize the mobile station with the K base stations. In these pilot signals, transmission powers of reverse pilot signals transmitted to base stations ranked in the top X (X is a natural number which is K or less) of reverse propagation quality are set to be high in proportion to the reverse propagation properties (step S705).

On the basis of synchronization information corresponding to a serving base station, a transmission timing of the reverse data signal is changed to synchronize the mobile station with the serving base station. On the basis of the first to Kth pieces of synchronization information, transmission timings of the first to Kth reverse pilot signals are changed to synchronize the mobile station with the K base stations. In these pilot signals, transmission powers of reverse pilot signals transmitted to base stations ranked in the top X of reverse propagation quality are set to be high in proportion to the reverse propagation properties, the control operation shifts to step S707 (step S706). Reverse transmission signals (the reverse data signal and the first to Kth reverse pilot signals) are transmitted (step S707).

The processes in the first to Mth mobile stations will be further described below by using the processes in the ith mobile station as an example. It is assumed that the first to Mth mobile stations perform the same processes.

$((i*N)+1)$th to $((i*N)+N)$th reverse pilot signals and the ith reverse data signal are generated. In step ST801, the ith mobile station receives the $((i*N)+1)$th to $((i*N)+N)$th forward control signals from the jth base station and separates the $((i*N)+1)$th to $((i*N)+N)$th pieces of synchronization information and the $((i*N)+1)$th to $((i*N)+N)$th pieces of propagation quality information from the $((i*N)+1)$th to $((i*N)+N)$th forward control signals, respectively.

The $((i*N)+j)$th reverse propagation quality information corresponding to the serving base station, the $((i*N)+1)$th to $((i*N)+(j-1))$th pieces of reverse propagation quality information corresponding to the non-serving base station, and the $((i*N)+(j+1))$th to $((i*N)+N)$th pieces of reverse propagation quality information are compared with each other. When any one of the $((i*N)+1)$th to $((i*N)+(j-1))$th pieces of reverse propagation quality information and the $((i*N)+(j+1))$th to $((i*N)+N)$th pieces of reverse propagation quality information exceeds the $((i*N)+j)$th reverse propagation quality information, on the basis of the $((i*N)+s)$th synchronization information corresponding to the sth base station having a maximum one of the $((i*N)+1)$th to $((i*N)+(j-1))$th pieces of reverse propagation quality information and the $((i*N)+(j+1))$th to $((i*N)+N)$th pieces of reverse propagation quality information, a transmission timing of the ith reverse data signal is changed to synchronize the ith mobile station with the sth base station. When the $((i*N)+j)$th reverse propagation quality information is equal to or larger than the $((i*N)+1)$th to $((i*N)+(j-1))$th pieces of reverse propagation quality information and the $((i*N)+(j+1))$th to $((i*N)+N)$th pieces of reverse propagation quality information, on the basis of the $((i*N)+j)$th synchronization information, a transmission timing of the ith reverse data signal is changed to synchronize the ith mobile station with the jth base station.

On the basis of the $((i*N)+1)$th to $((i*N)+N)$th pieces of synchronization information, transmission timings of the $((i*N)+1)$th to $((i*N)+N)$th reverse pilot signals are changed to synchronize the mobile station with the first to Nth base stations. Furthermore, at least one of a transmission frequency, the number of repetitions of transmission, and transmission powers of reverse pilot signals transmitted to base stations ranked in the top X of $((i*N)+1)$th to $((i*N)+N)$th pieces of reverse propagation quality information is set to increase in an ascending order of the reverse propagation qualities, and the $((i*N)+1)$th to $((i*N)+N)$th reverse pilot signals and the ith reverse data signal are output as an ith reverse transmission signal.

In this manner, according to the embodiment, when the mobile station determined to switch the base stations, the mobile station can be synchronized with the destination base station.

Embodiment 4

In a fourth embodiment, a mobile station selects a base station, and a criterion for selecting a base station is forward propagation quality. When a forward control signal to a mobile station is transmitted by a serving base station (SBS). A transmission timing of the forward transmission signal is a timing when request information is received, information of the forward control signal transmitted to the mobile station is synchronization information corresponding to the base station which makes the request. When the transmission timing is a timing when a periodic trigger is detected, the information of the forward control signal transmitted to the mobile station is synchronization information of the serving base station.

Figure 20:
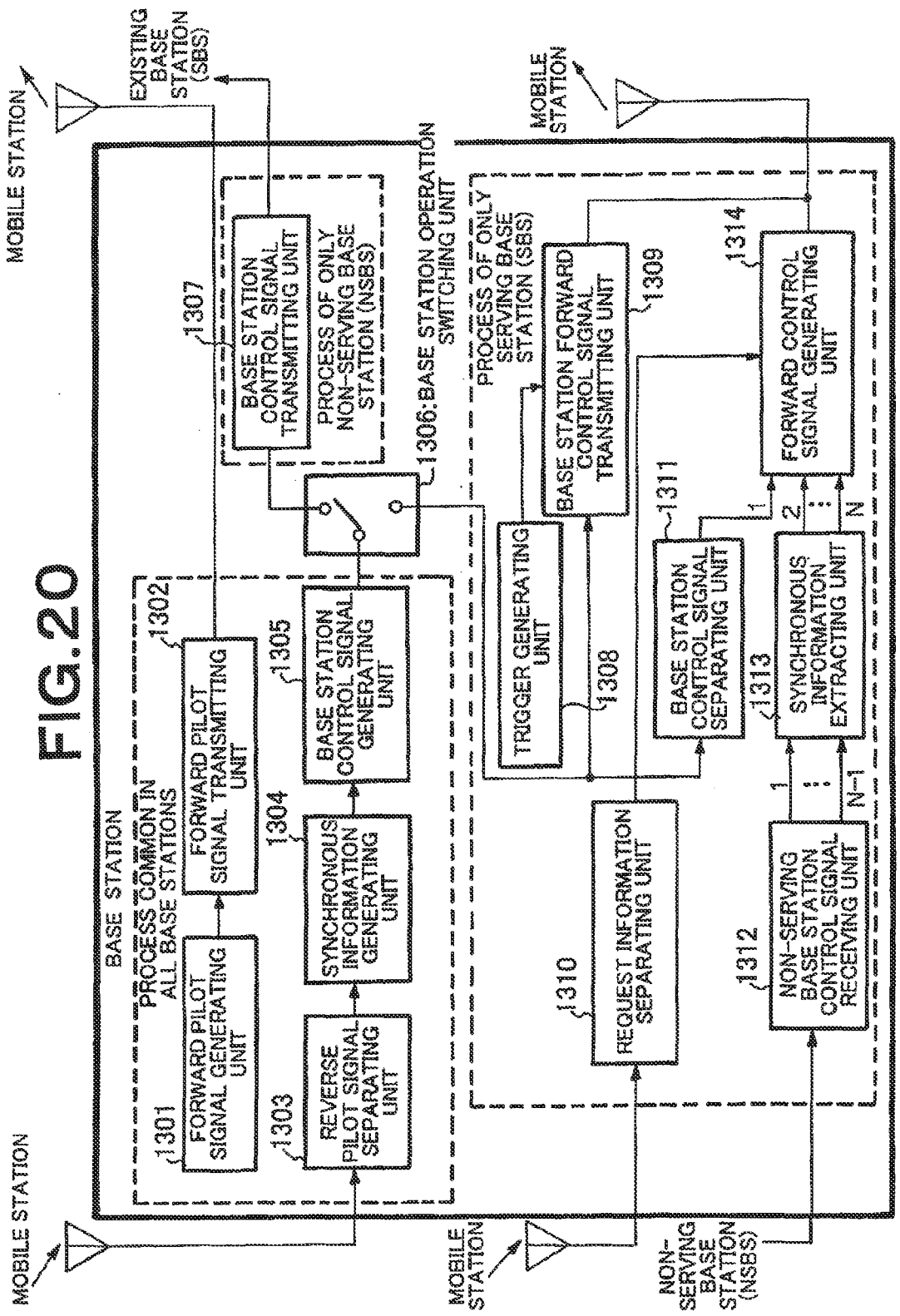
FIG. 20 is a functional block diagram of a base station according to a fourth embodiment.

FIG. 20 is a functional block diagram of first to Nth base stations according to the fourth embodiment. A forward pilot signal separating unit 1301 generates and outputs a forward pilot signal. A forward pilot transmitting unit 1302 transmits the forward pilot signal to the mobile station as a forward pilot transmission signal. A reverse pilot signal separating unit 1303 separates a reverse pilot signal from a reverse link signal transmitted by an ith mobile station and outputs the reverse pilot signal. A synchronous information generating unit 1304 estimates a reception timing on the basis of the reverse pilot signal and generates and outputs information corresponding to a transmission timing of the ith mobile station at which the ith mobile station is synchronized with the base station as synchronization information. A base station control signal generating unit 1305 of its own base station generates and outputs reverse propagation quality information and synchronization information as a base station control signal of its own base station. A base station operation switching unit 1306 switches operations depending whether its own base station is a base station (SBS) which is being connected to the mobile station. A base station control signal transmitting unit 1307 of its own base station transmits the base station control signal of its own base station as a base station control transmission signal of its own base station.

A trigger generating unit 1308 periodically generates and outputs a trigger signal. When the trigger signal is received, a base station forward control signal transmitting unit 1309 of its own base station transmits the base station control signal of its own base station to the mobile station as a base station forward control transmission signal of its own base station. A base station control signal separating unit 1311 of its own base station separates synchronization information from the base station control signal of the own base station and outputs the synchronization information. A request information separating unit 1310 separates request information from the reverse link signal transmitted by the ith mobile station and outputs the request information. A non-serving base station control signal receiving unit 1312 separates and outputs a control signal for each of the non-serving base stations in signals received from all the non-serving base stations. A synchronous information extracting unit 1313 separates and outputs synchronization information in the control signal for the non-serving base station. A forward control signal generating unit 1314 transmits synchronization information corresponding to the base station indicated by the request information to the ith mobile station as a forward control signal. An antenna is used for both transmission and reception, and may also be configured to be switchably connected to a transmission signal and a reception signal.

Figure 21:
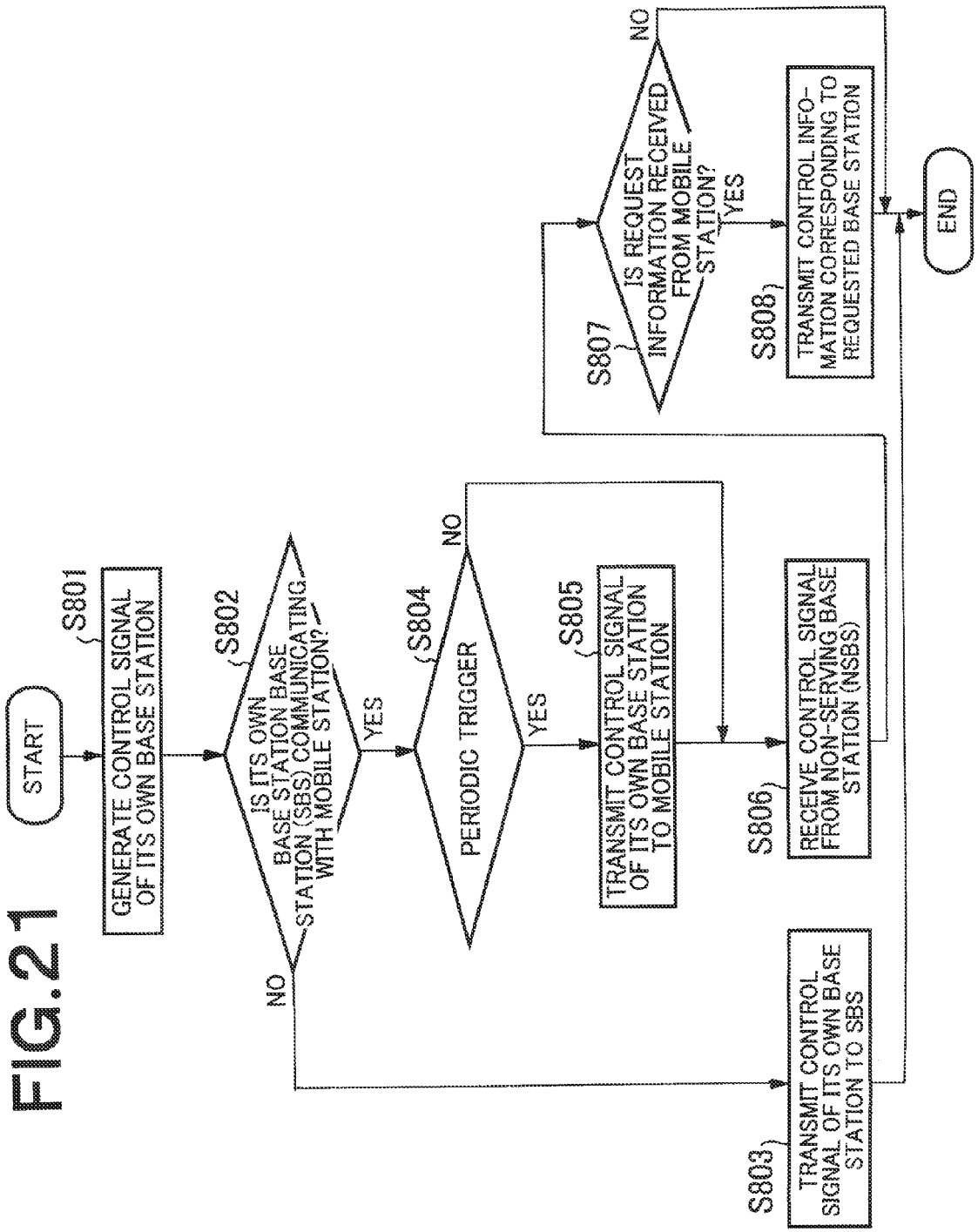
FIG. 21 is a flow chart showing processes of the base station according to the fourth embodiment.

FIG. 21 is a flow chart showing processes of the base stations according to the embodiment. A reverse pilot signal transmitted by the mobile station to the own base station is separated from a reception signal. On the basis of the reverse pilot signal, a reception timing is estimated, and information to synchronize the mobile station with the base station is output as synchronization information. The synchronization information is output as a control signal for the own base station (step S801). It is checked whether the own base station is a base station (SBS) which is being connected to the mobile station. When the own base station is the SBS, the control operation shifts to step S804. When the base station is a base station (NSBS) which is not being connected to the mobile station, the control operation shifts to step S803 (step S802).

Control information of the own base station is transmitted to the SBS (step S803). A trigger signal periodically generated by the SBS is monitored by the SBS. When the SBS detects the trigger signal, the control operation shifts to step S805. When the SBS does not detect the trigger signal, the control operation shifts to step S806 (step S804). The control information for the own base station is transmitted to the mobile station as a base station forward control signal of the own base station (step S805). A control signal is received from the NSBS, synchronization information is extracted and output. (S806) When request information is received from the mobile station, the control operation shifts to step S808. When no request information is received, the processes are ended (step S807). A control signal for the base station corresponding to the received request information is transmitted to the mobile station as a forward control signal (step S808).

In this case, the processes in the processes in the first to Nth base stations will be further described by using processes in an ath (a is an arbitrary natural number which is N or less) base station as an example.

When request information which transmits a forward control signal is received from an ith (i is a natural number which is M or less), on the basis of a pilot signal transmitted by the ith mobile station, a reception timing in the ath base station is estimated, and ((i*N)+a)th synchronization information to synchronize the ith mobile station with the ath base station is generated as an ((i*N)+a)th forward control signal. A ((i*N)+a)th forward pilot signal transmitted by the ath base station to the ith mobile station is generated by the ath base station.

Thereafter, the ((i*N)+a)th forward control signal and the ((i*N)+a)th forward pilot signal are transmitted to the ith mobile station.

Even though the request information to transmit the forward control signal is not received, a trigger periodically generated by the base station in a predetermined cycle is monitored. When the trigger is detected, the same processes as described above are performed, the ((i*N)+a)th forward control signal and the ((i*N)+a)th forward pilot signal are transmitted to the ith mobile station.

When the trigger is not detected, the processes in the ath base station are ended.

FIG. 22 is a functional block diagram of the first to Mth mobile stations according to the embodiment. A forward pilot signal separating unit 2301 separates forward pilot signals corresponding to all the base stations from a reception signal received by the mobile station and outputs the forward pilot signal. A forward propagation quality estimating unit 2302 estimates forward propagation qualities of all the base stations on the basis of the forward pilot signals and outputs forward propagation quality information. A threshold comparing unit 2303 compares the forward propagation qualities with a threshold value and outputs comparison results corresponding to all the base stations as threshold comparison information. When a request information transmitting unit 2304 confirms that at least one of the forward propagation qualities exceeds the threshold value, the request information transmitting unit 2304 generates request information which requests the SBS to transmit forward control signals corresponding to L (L is a natural number which is N or less) base stations the forward propagation qualities of which exceed the threshold value to the mobile station, and transmits the request information to the SBS. An optimum base station selecting unit 2305 selects an optimum base station on the basis of the forward propagation qualities (1 to N), and outputs information indicating the optimum base station as optimum base station selection information.

A nonperiodic forward control signal separating unit 2306 separates the forward control signal transmitted by the SBS on the basis of the request information from the reception signal received by the mobile station, and outputs the forward control signal as a nonperiodic forward control signal. A nonperiodic synchronous information extracting unit 2307 extracts nonperiodic synchronization information from the nonperiodic forward control signal and outputs the nonperiodic synchronization information.

A periodic forward control signal separating unit 2308 separates a forward control signal periodically transmitted by the SBS from the reception signal received by the mobile station and outputs the forward control signal as a periodic forward control signal. A periodic synchronous signal extracting unit 2309 extracts synchronization information from the periodic forward control signal and outputs the synchronization information as periodic synchronization information.

A reverse data signal generating unit 2311 generates and outputs a reverse data signal. A reverse pilot signal generating unit 2312 generates and outputs a reverse pilot signal. A reverse signal generating unit 2313 generates and outputs the reverse data signal and the reverse pilot signal as reverse signals.

When the base station indicated by the optimum base station selection information is different from the serving base station, a transmission timing setting unit 2310 sets a transmission timing on the basis of the nonperiodic synchronization information corresponding to the base station indicated by the optimum base station selection information to synchronize the mobile station with the base station indicated by the optimum base station selection information. When the base station indicated by the optimum base station selection information is the same as the serving base station, a transmission timing is set by using the latest information of the nonperiodic synchronization information corresponding to the base station indicated by the optimum base station selection information and the periodic synchronization information to synchronize the mobile station with the serving base station, and a reverse transmission signal is transmitted. An antenna is used for both transmission and reception, and may also be configured to be switchably connected to a transmission signal and a reception signal.

FIG. 23 is a flow chart showing processes in the first to Mth mobile stations. A reverse data signal and a reverse pilot signal are generated and output as reverse transmission signals (step S901). Forward propagation quality corresponding to the base station is estimated (step S902). A forward control signal of an SBS periodically transmitted by a base station (SBS) which is being connected to the mobile station is received, and synchronization information is separated and extracted (step S903). The forward propagation quality is compared with a threshold value. When the forward propagation quality corresponding to at least one of the base stations exceeds the threshold value, the control operation shifts to step S905. When the forward propagation quality does not exceed the threshold value, the control operation shifts to step 910 (step S904).

Request information representing that all pieces of forward control information corresponding to the base station the forward propagation quality of which exceeds the threshold value are requested from the SBS is transmitted from the mobile station to the SBS (step S905). A forward control signal corresponding to the request information is received, and synchronization information is separated and output (step S906). On the basis of the forward propagation quality information, an optimum base station is selected. Information representing the optimum base station is generated as optimum base station selection information (step S907). When the base station represented by the optimum base station selection information is different from the SBS, the control operation shifts to step S909. When the base station represented by the optimum base station selection information is the same as the SBS, the control operation shifts to step S910 (step S908). A transmission timing of a reverse transmission signal is changed to synchronize a base station connected to the mobile station with a newly selected base station, and the control operation shifts to step S911 (step S909). The transmission timing of the reverse transmission signal is changed to synchronize the base station connected to the mobile station with the serving base station (step S910). The reverse signals (reverse data signal and reverse pilot signal) are transmitted (step S911).

The processes in the first to Mth mobile stations will be further described below by using the processes in the ith mobile station as an example. It is assumed that the first to Mth mobile stations perform the same processes.

First, the ith mobile station receives ((i*N)+1)th to ((i*N)+N)th forward control signals and ((i*N)+1)th to ((i*N)+N)th forward pilot signals from the first to Nth base stations and separates ((i*N)+1)th to ((i*N)+N)th pieces of synchronization information from the ((i*N)+1)th to ((i*N)+N)th forward control signals, respectively.

Next, an ith reverse data signal and an ith reverse pilot signal are generated as ith reverse transmission signals.

On the basis of the ((i*N)+1)th to ((i*N)+N)th forward pilot signals, propagation qualities of forward links corresponding to the first to Nth base stations are estimated, and ((i*N)+1)th to ((i*N)+N)th pieces of forward propagation quality information are generated.

The pieces of forward propagation quality information are compared with a threshold value (D), and request information is generated and transmitted to the base station the forward propagation quality information of which exceeds the threshold value (D) such that the forward control signal is transmitted to the ith mobile station.

Then, ((i*N)+j)th (j is a natural number which is N or less) forward propagation quality information corresponding to the serving base station, ((i*N)+1)th to ((i*N)+(j−1))th pieces of forward propagation quality information corresponding to the non-serving base station, and ((i*N)+(j+1))th to ((i*N)+N)th pieces of forward propagation quality information are compared with each other, respectively. When any one of the ((i*N)+1)th to ((i*N)+(j−1))th pieces of forward propagation quality information and the ((i*N)+(j+1))th to ((i*N)+N)th pieces of forward propagation quality information exceeds the ((i*N)+j)th forward propagation quality information, on the basis of the ((i*N)+s)th synchronization information corresponding to an sth (s is a natural number which is N or less except for j) base station having a maximum one of the ((i*N)+1)th to ((i*N)+(j−1))th pieces of forward propagation quality information and the ((i*N)+(j+1))th to ((i*N)+N)th pieces of forward propagation quality information, transmission is performed such that a transmission timing of the ith reverse transmission signal is changed to synchronize the ith mobile station with the sth base station. When the ((i*N)+j)th reverse propagation quality information is equal to or larger than the ((i*N)+1)th to ((i*N)+(j−1))th pieces of reverse propagation quality information and the ((i*N)+(j+1))th to ((i*N)+N)th pieces of reverse propagation quality information, on the basis of the ((i*N)+j)th synchronization information, transmission is performed such that the transmission timing of the ith reverse transmission signal is changed to synchronize the ith mobile station with the jth base station.

In this manner, according to the embodiment, when the mobile station determines to switch the base stations, the mobile station can be synchronized with a destination base station.

What is claimed is:

1. A base station control device in a wireless communication system including a plurality of base stations, a mobile station, and the base station control device, the base station control device configured to:
    select a new base station with which the mobile station communicates, on the basis of control signals received from the plurality of base stations, each of the control signals including synchronization information on each of the plurality of the base stations; and
    transmit control information on the new base station, to at least one of the plurality of base stations.

2. The base station control device according to claim 1, wherein the base station control device is further configured to transmit the control information on the new base station to at least one of a serving base station with which the mobile station communicates and the new base station.

3. A wireless communication system comprising:
    a plurality of base stations;
    a mobile station; and
    a base station control device configured to receive control signals from the plurality of base stations, each of the control signals including synchronization information on each of the plurality of base stations,
    the base station control device configured to:
    select a new base station with which the mobile station communicates, on the basis of the control signals; and
    transmit control information on the new base station, to at least one of the plurality of base stations.

4. A wireless communication method for a base station control device in a wireless communication system including a plurality of base stations, a mobile station, and the base station control device, the wireless communication method comprising:
    selecting a new base station with which the mobile station communicates, on the basis of control signals received from the plurality of base stations, each of the control signals including synchronization information on each of the plurality of the base stations; and
    transmitting control information on the new base station, to at least one of the plurality of base stations.

* * * * *